US009756512B2

(12) United States Patent
Xu

(10) Patent No.: US 9,756,512 B2
(45) Date of Patent: Sep. 5, 2017

(54) EXCHANGING INTERFERENCE VALUES

(71) Applicant: QUALCOMM Incorporated, San Diego, CA (US)

(72) Inventor: Bin Xu, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/232,250

(22) Filed: Aug. 9, 2016

(65) Prior Publication Data

US 2017/0118661 A1    Apr. 27, 2017

Related U.S. Application Data

(60) Provisional application No. 62/245,009, filed on Oct. 22, 2015.

(51) Int. Cl.
| H04L 1/24 | (2006.01) |
| H04W 24/02 | (2009.01) |
| H04L 12/741 | (2013.01) |
| H04B 17/336 | (2015.01) |
| H04L 12/801 | (2013.01) |
| H04L 5/00 | (2006.01) |
| H04L 25/00 | (2006.01) |
| H04W 84/00 | (2009.01) |
| H04W 88/00 | (2009.01) |
| H04B 17/345 | (2015.01) |
| H04W 84/12 | (2009.01) |

(52) U.S. Cl.
CPC .......... *H04W 24/02* (2013.01); *H04B 17/336* (2015.01); *H04B 17/345* (2015.01); *H04L 1/248* (2013.01); *H04L 5/00* (2013.01); *H04L 25/00* (2013.01); *H04L 45/745* (2013.01); *H04L 47/29* (2013.01); *H04W 84/00* (2013.01); *H04W 88/00* (2013.01); *H04W 84/12* (2013.01)

(58) Field of Classification Search
CPC ..... H04W 24/02; H04W 88/00; H04W 84/00; H04W 84/12; H04B 17/345; H04B 117/336; H04L 25/00; H04L 5/00; H04L 1/248; H04L 47/29; H04L 45/745
See application file for complete search history.

(56) References Cited

U.S. PATENT DOCUMENTS

| 8,170,051 | B2 | 5/2012 | Yonge, III et al. |
| 8,488,478 | B1 * | 7/2013 | Leytus ............... H04L 27/2647 |
| | | | 370/252 |
| 9,071,474 | B1 | 6/2015 | Zhang |

(Continued)

FOREIGN PATENT DOCUMENTS

WO    2012156574 A1    11/2012

OTHER PUBLICATIONS

International Search Report and Written Opinion—PCT/US2016/051043—ISA/EPO—Nov. 17, 2016.

*Primary Examiner* — Jean B Corrielus
(74) *Attorney, Agent, or Firm* — Toler Law Group, PC.

(57) ABSTRACT

A method includes determining, at a first wireless device of a first basic service set (BSS), an interference value associated with receipt of a signal from a second wireless device of a second BSS. The method further includes transmitting a full-amplitude pulse and a coded-amplitude pulse from the first wireless device to a third wireless device of the first BSS. An amplitude of the coded-amplitude pulse indicates the interference value.

30 Claims, 10 Drawing Sheets

(56) References Cited

U.S. PATENT DOCUMENTS

| | | | |
|---|---|---|---|
| 9,544,108 B2* | 1/2017 | Geirhofer | H04L 5/0048 |
| 2009/0082002 A1 | 3/2009 | Kim et al. | |
| 2010/0118835 A1 | 5/2010 | Lakkis et al. | |
| 2011/0009137 A1* | 1/2011 | Chung | H04L 5/0048 |
| | | | 455/501 |
| 2013/0195036 A1 | 8/2013 | Quan et al. | |
| 2013/0235737 A1 | 9/2013 | Merlin et al. | |
| 2014/0082185 A1 | 3/2014 | Abraham et al. | |
| 2015/0003261 A1* | 1/2015 | Silverman | H04B 7/0456 |
| | | | 370/252 |
| 2015/0032445 A1* | 1/2015 | Souden | G10L 21/0264 |
| | | | 704/208 |
| 2015/0070204 A1* | 3/2015 | Shirakawa | G01S 7/354 |
| | | | 342/90 |

* cited by examiner

EXCHANGING INTERFERENCE VALUES

I. CROSS REFERENCE TO RELATED APPLICATIONS

The present application claims the benefit of U.S. Provisional Patent Application No. 62/245,009, entitled "EXCHANGING INTERFERENCE VALUES," filed Oct. 22, 2015, which is expressly incorporated by reference herein in its entirety.

II. FIELD

The present disclosure is generally related to exchanging interference values.

III. DESCRIPTION OF RELATED ART

In a densely deployed WiFi system, multiple access points (APs) may be deployed in an area. If the WiFi system includes multiple overlapping basic service sets (OBSSs), performance of the WiFi system may be negatively impacted. To illustrate, devices included in the WiFi system may communicate using a media access control (MAC) protocol, such as a carrier sense multiple access (CSMA) protocol, in which a device defers using a shared channel if the device detects that the shared channel is being used by another device. If a particular device repeatedly defers use of the shared channel, system throughput and per-link fair bandwidth allocation of the WiFi system may degrade. In some implementations, a WiFi system may be designed such that non-overlapping channels are allocated to OBSSs. However, when non-overlapping channels are used, bandwidth efficiency of the WiFi system may be reduced if one or more OBSSs are idle.

IV. SUMMARY

In a particular aspect, an apparatus includes a processor of a first wireless device of a first basic service set (BSS). The processor is configured to determine an interference value associated with receipt of a signal from a second wireless device of a second BSS. The interference value may correspond to a carrier path loss associated with communication of the signal from the second wireless device to the first wireless device. The processor may be configured determine the interference value based on a received amplitude of a second pulse received from the second wireless device. The apparatus further includes a transmitter configured to transmit a full-amplitude pulse and a coded-amplitude pulse from the first wireless device to a third wireless device of the first BSS. An amplitude of the coded-amplitude pulse is based on the interference value. In a particular example, the interference value corresponds to a carrier path loss associated with communication of the signal from the second wireless device to the first wireless device.

In another particular aspect, a method of transmitting an indication of an interference value includes determining, at a first wireless device of a first BSS, the interference value associated with receipt of a signal from a second wireless device of a second BSS. The method further includes transmitting a full-amplitude pulse and a coded-amplitude pulse from the first wireless device to a third wireless device of the first BSS. An amplitude of the coded-amplitude pulse indicates the interference value.

In another particular aspect, a computer readable medium device storing instructions is disclosed. The instructions, when executed by a processor, cause the processor to perform operations including determining, at a first wireless device of a first BSS, an interference value associated with receipt of a signal from a second wireless device of a second BSS. The operations further include initiating transmission of a full-amplitude pulse and a coded-amplitude pulse from the first wireless device to a third wireless device of the first BSS. An amplitude of the coded-amplitude pulse is based on the interference value. The operations may further include receiving a second coded-amplitude pulse and a third pulse from the second wireless device. The operations may further include, based on a difference or a ratio between a received amplitude of the third pulse and a received amplitude of the second coded-amplitude pulse, determining an interference value associated with communication between the third wireless device and the second wireless device. In a particular example, the operations further include receiving a second pulse from a fourth wireless device. The operations may further include determining based, on a received amplitude of the second pulse, a carrier path loss associated with communication of signals from the fourth wireless device. The second pulse may be transmitted by the fourth wireless device with a full-amplitude. The operations may further include initiating transmission of a second coded-amplitude pulse to the second wireless device. An amplitude of the second coded-amplitude pulse may be based on the carrier path loss In another particular aspect, an apparatus includes means for determining, at a first wireless device of a first BSS, an interference value associated with receipt of a signal from a second wireless device of a second BSS. The apparatus further includes means for transmitting a full-amplitude pulse and a coded-amplitude pulse from the first wireless device to a third wireless device of the first BSS. An amplitude of the coded-amplitude pulse is based on the interference value.

V. BRIEF DESCRIPTION OF THE DRAWINGS

VI. DETAILED DESCRIPTION

Figure 1:
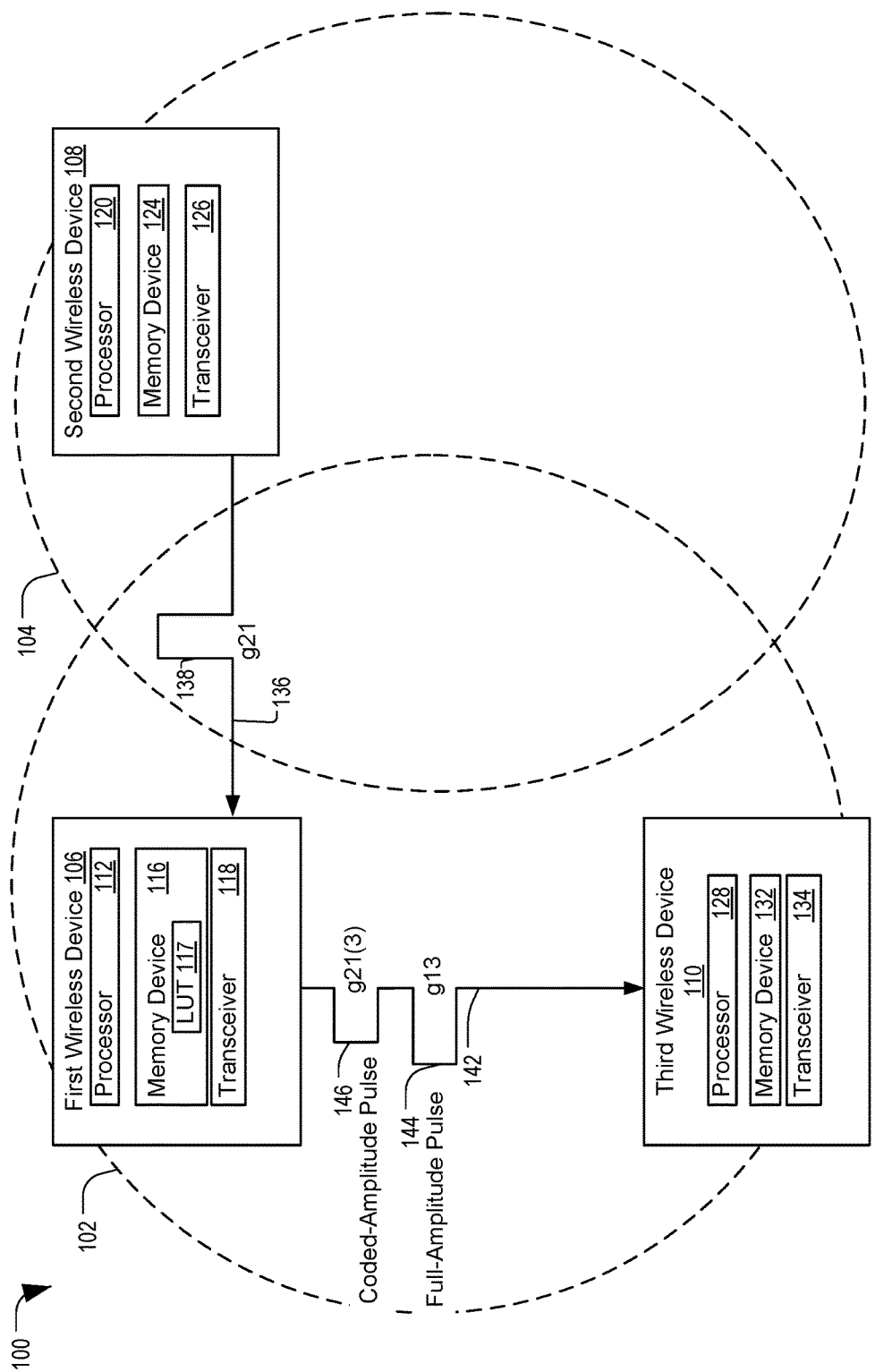
FIG. 1 is a diagram of an example of a system that supports communication of interference values.

Particular aspects of the present disclosure are described below with reference to the drawings. In the description, common features are designated by common reference numbers throughout the drawings. As used herein, various terminology is used for the purpose of describing particular implementations and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, or an aspect, and should not be construed as limiting or as indicating a preference or a preferred implementation. As used herein, an ordinal term, such as "first," "second," "third," etc., used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present disclosure describes systems and methods for determining and sharing interference values between devices in overlapping basic service sets (BSSs) and using such interference values to determine whether or not to perform parallel channel access. According to the present disclosure, when a first device of a first BSS detects that a second device of an overlapping BSS is utilizing a particular channel, the first device may determine whether to communicate in parallel over the particular channel rather than backing off (as would occur using a carrier sense multiple access (CSMA) protocol) and waiting for the second device to stop utilizing the particular channel. The first device may make a determination regarding parallel use of the channel based on a first interference value associated with data received from the second device and a second interference value associated with second data received by the second device from the first device. The first interference value may indicate interference at the first device caused by data transmissions from the second device and the second interference value may indicate interference at the second device caused by data transmissions from the first device.

Wireless devices (e.g., mobile devices, access points, or a combination thereof) may exchange interference values using one or more pulses. The pulses described herein may refer to standalone pulses operating at a designated frequency or to subcarriers embedded in WiFi orthogonal frequency-division multiplexing (OFDM) symbols located at the same frequency. The pulses may include full-amplitude pulses (e.g., pulses transmitted having a reference amplitude) and coded amplitude pulses (e.g., pulses transmitted having a fraction of the reference amplitude, where a value of the fraction indicates an interference value).

For example, a method of transmitting an interference value may include receiving, at a first wireless device of a first BSS, a signal from a second wireless device of a second BSS. The signal may include a full-amplitude pulse. Based on an amplitude of the full-amplitude pulse as received by the first wireless device, the first wireless device may determine an interference value associated with receipt of signals from the second wireless device at the first wireless device. To illustrate, the interference value may correspond to a carrier path loss value indicating carrier path loss of the signal. The signal may be considered interference by the first wireless device because the first and second wireless devices are in different BSSs. The method may further include transmitting a second full-amplitude pulse and a coded-amplitude pulse from the first wireless device to a third wireless device of the first BSS. An amplitude of the coded-amplitude pulse indicates the interference value. For example, a ratio of an amplitude of the coded-amplitude pulse to an amplitude of the second full-amplitude pulse may indicate the interference value. Accordingly, the third wireless device may receive the interference value. Further, the third wireless device may determine a second carrier path loss value associated with receiving signals at the third wireless device from the first wireless device based on an amplitude of the second full-amplitude pulse as received by the third wireless device. The second carrier path loss value may not be considered an interference value because the first and third wireless devices are included in the same BSS. Thus, the method may be used by wireless devices of the first and second BSSs to exchange carrier path loss values (including interference values). A wireless device of one of the BSSs may use the carrier path loss values to determine whether to share a channel with a wireless device of the other BSS.

Referring to FIG. 1, a system 100 in which overlapping basic service sets may communicate carrier path loss values to enable parallel use of one or more channels is shown. A carrier path loss value may be associated with receipt of a signal at a first wireless device of one BSS from a second wireless device of another BSS. The first wireless device may communicate the carrier path loss value to other wireless devices, as described herein. As used herein, wireless device refers to a device that may communicate wirelessly. Wireless devices may include, for example, access points (APs), mobile stations (STAs), or a combination thereof. An AP may be a device that relays wireless messages to or from one or more STAs. A mobile station may include a mobile device. Wireless devices may in some instances be attached to wires. For example, an AP may act as a gateway device to a wired network, such as an Ethernet network. In addition or in the alternative, a wireless device may be attached to a power cable.

The system 100 includes a first wireless device 106, a second wireless device 108, and a third wireless device 110. The first wireless device 106 and the third wireless device 110 are included in a first basic service set (BSS) 102, and the second wireless device 108 is included in a second BSS 104. The second BSS 104 may include one or more additional wireless devices that may transmit signals to or receive signals from the second wireless device 108. One or both of the BSSs 102, 104 may include a different number of wireless devices than illustrated in FIG. 1. As shown in FIG. 1, the first BSS 102 and the second BSS 104 overlap. That is, wireless devices of the first BSS 102 may receive signals transmitted by wireless devices of the second BSS 104, and vice versa.

The first wireless device 106 includes one or more processors, such as a processor 112. The processor 112 may include a central processor unit, a digital signal processor, or a combination thereof. The first wireless device 106 further includes a memory device 116. In some examples, the memory device 116 may include a non-transitory computer readable medium. The memory device 116 may include a hard disk drive, a random access memory, a solid state drive, or any other storage device. The first wireless device 106 further includes a transceiver 118. The transceiver 118 is adapted to wirelessly transmit signals to and to receive signals from other wireless devices. The signals may include one or more pulses transmitted at a particular frequency. In some implementations, the transceiver 118 includes a separate transmitter and receiver. The transceiver 118 may be configured to operate in accordance with an Institute of Electrical and Electronics Engineers (IEEE) 802.11 wireless interface specification.

The second wireless device 108 includes a processor 120, a memory device 124, and a transceiver 126. The processor 120, the memory device 124, and the transceiver 126 may be analogous to the processor 112, the memory device 116, and the transceiver 118 of the first wireless device 106. However, it should be noted that in some implementations, the first wireless device 106 and the second wireless device 108 may have another configuration. For example, the first wireless device 106 and the second wireless device 108 may have different hardware components, software components, or a combination thereof.

The third wireless device 110 includes a processor 128, a memory device 132, and a transceiver 134. The processor 128, the memory device 132, and the transceiver 134 may be analogous to the processor 112, the memory device 116, and the transceiver 118 of the first wireless device 106. However, it should be noted that in some implementations the first wireless device 106 and the third wireless device 110 may have another configuration. For example, the first wireless device 106 and the third wireless device 110 may have different hardware components, software components, or a combination thereof.

The first wireless device 106 and the third wireless device 110 may be configured to communicate with each other as part of the first BSS 102. To illustrate, the first wireless device 106 and the third wireless device 110 may communicate via wireless signals exchanged via the transceivers 118, 134. Similarly, the second wireless device 108 may use the transceiver 126 to transmit signals to and to receive signals from another device of the second BSS 104. As explained above, the first BSS 102 and the second BSS 104 overlap, which may result in the second wireless device 108 receiving one or more signals transmitted by the first wireless device 106 or the third wireless device 110. Signals transmitted by the wireless devices 106, 110 of the first BSS 102 may interfere with signals transmitted by the second wireless device 108 of the second BSS 104.

In operation, the second wireless device 108 may transmit a first signal 136 that includes a first full-amplitude pulse 138 to the first wireless device 106 via the transceiver 126. The first full-amplitude pulse 138 may be a "full-amplitude" pulse by virtue of having a largest available amplitude when the first full-amplitude pulse 138 is generated. For example, wireless devices may negotiate the largest available amplitude for use in communication. Alternatively, the largest available amplitude may be determined based on a wireless protocol or standard in use by the wireless devices. In particular implementations, full-amplitude pulses, such as the first full-amplitude pulse 138, correspond to full power tones (FPTs) of an orthogonal frequency-division multiplexing (OFDM) symbol. In other implementations, the full-amplitude pulses correspond to fractions of FPTs. When the first full-amplitude pulse 138 travels through a wireless medium, such as air, the amplitude of the first full-amplitude pulse 138 may change, depending on channel conditions experienced by the first full-amplitude pulse 138. Thus, when the first full-amplitude pulse 138 is received at the first wireless device 106, the amplitude of the first full-amplitude pulse 138, as received, may not be the largest available amplitude. The first wireless device 106 may be able to estimate carrier path loss experienced by the first full-amplitude pulse 138 by comparing the largest available amplitude to the amplitude of the first full-amplitude pulse 138 as received. In some examples, the first wireless device 106 may store an indication that the first full-amplitude pulse 138 was transmitted with the largest available amplitude. For example, protocol information, such as transmission sequence information, stored in the memory device 116 may be used to determine that the first full-amplitude pulse 138 was transmitted with the largest available amplitude. Thus, the first wireless device 106 may store an indication of the largest available amplitude in the memory device 116.

The processor 112 may compare the amplitude of full-amplitude pulses to the amplitude of the first full-amplitude pulse 138 as received by the first wireless device 106 (e.g., a received amplitude). Based on a difference or ratio between the largest available amplitude and the amplitude of the first full-amplitude pulse 138 as received, the processor 112 may determine carrier path loss associated with signals transmitted between the first wireless device 106 and the second wireless device 108. The difference or ratio may be determined based on a comparison between the largest available amplitude and the amplitude of the first full-amplitude pulse 138 as received. Carrier path loss values may be denoted in the format gij, where gij is the carrier path loss g from wireless device-i to wireless device-j. As used in connection with FIGS. 1-5, wireless device-1 may correspond to the first wireless device 106, wireless device-2 may correspond to the second wireless device 108, wireless device-3 may correspond to the third wireless device 110, etc. Generally, gij is equal to gji. Thus, a difference between the first full-amplitude pulse 138 as transmitted by the second wireless device 108 and as received by the first wireless device 106 may indicate g21 (and g12) to the first wireless device 106. Signals transmitted by the second wireless device 108 to wireless devices of the second BSS may be considered interference by the first wireless device 106. Therefore, g21 may be considered an interference value (or related to an interference value). That is, g21 may correspond to a value indicating interference expected at the first wireless device 106 due to data transmissions made by the second wireless device 108.

The first wireless device 106 may transmit a second full-amplitude pulse 144 and a coded-amplitude pulse 146 using the transceiver 118. In particular examples, coded-amplitude pulses, such as the coded-amplitude pulse 146, are coded-amplitude tones (CATs) of an OFDM symbol. The second full-amplitude pulse 144 may be generated with an amplitude equal to the largest available amplitude, as described above. An amplitude of the coded-amplitude pulse 146 may be based on the carrier path loss value g21. As explained above, g21 may be considered an interference value. The memory device 116 may store a lookup table 117 or other data structure that associates carrier path loss values with index values. The processor 112 may identify an entry of the lookup table 117 that corresponds to g21. The processor 112 may calculate the amplitude of the coded-amplitude pulse 146 such that a ratio or a difference between the largest available amplitude and the amplitude of the coded-amplitude pulse 146 corresponds to an index of the entry of the lookup table 117. The ratio or difference may correspond to the index when the difference is equal to or is within a range of the index. Therefore, a difference or ratio between the amplitude of the second full-amplitude pulse 144 and the amplitude of the coded-amplitude pulse 146 may indicate g21 (e.g., may correspond to an entry of the lookup table 117 identifying g21).

Wireless devices that include the lookup table 117 described above (or a corresponding data structure) may interpret coded-amplitude pulses to identify carrier-path loss experienced between other wireless devices. While not shown in FIG. 1, each of the wireless devices 108, 110 may store the lookup table 117 (or other data structure). The notation gij(k) may refer to the carrier path loss g between wireless device-i and wireless device-j as identified (e.g., based on a coded-amplitude pulse) by wireless device-k. Generally, gij(k) is equal to gji(k). However, in some instances, gij(k) and gji(k) may be different.

The first wireless device 106 may transmit, via the transceiver 118, a second signal 142 that includes the second full-amplitude pulse 144 and the coded-amplitude pulse 146 to the third wireless device 110. The third wireless device 110 may receive the second signal 142 via the transceiver 134. The processor 128 of the third wireless device 110 may determine a second carrier path loss value g13 associated with signals received at the third wireless device 110 from the first wireless device 106 based on an amplitude of the second full-amplitude pulse 144. To illustrate, the amplitude of the second full-amplitude pulse 144 may be diminished when received by the third wireless device 110. The processor 128 may determine the second carrier path loss value, g13, by comparing the amplitude of the second full-amplitude pulse 144 as received to the largest available amplitude stored in the memory device 132. The second carrier path loss value, g13, may indicate an expected reliability of data transmissions between the third wireless device 110 and the first wireless device 106.

The processor 128 may further derive the carrier path loss value, g21, associated with communications received at the first wireless device 106 from the second wireless device 108 based on the amplitude of the coded-amplitude pulse 146. That is, the processor 128 may determine g21(3) based on the coded-amplitude pulse 146. As explained above, a difference or ratio between the amplitudes of the second full-amplitude pulse 144 as received and the coded-amplitude pulse 146 as received may index the lookup table 117 stored in the memory device 132. Therefore, the second signal 142 may indicate, to the third wireless device 110, the second carrier path loss value corresponding to expected reliability of transmissions between the first wireless device 106 and the third wireless device 110. The second signal 142 may further indicate, to the third wireless device 110, the carrier path loss value corresponding to expected interference at the first wireless device 106 due to data transmissions from the second wireless device 108. As explained further with reference to FIG. 8, the processor 128 may determine whether to enable transmission of data to the first wireless device 106 over a channel in use by the second wireless device 108 based on the carrier path loss value and the second carrier path loss value.

Thus, FIG. 1 illustrates exchange of signals indicating carrier path loss values in a system. The carrier path loss values may be used to determine whether to enable parallel use of a channel, which may increase throughput over the channel as additional BSSs are added to a communications system, as described further below with reference to FIG. 8. A more comprehensive example of exchanging carrier path loss values between wireless devices in two overlapping BSSs is described with reference to FIGS. 2-5.

Referring to FIGS. 2-5, diagrams illustrating interactions between wireless devices of overlapping BSSs are depicted. As shown in FIGS. 2-5, a plurality of wireless devices in a system including overlapping BSSs may distribute carrier path loss values between the wireless devices of the system. For example, as illustrated in FIGS. 2-5 the wireless devices 106, 108, and 110 of the system 100 may distribute carrier path loss values. Further, the system 100 is illustrated in FIGS. 2-5 as including a fourth wireless device 202 as part of the second BSS 104. The fourth wireless device 202 may include components corresponding to components of the wireless devices 106, 108, and 110. For example, the fourth wireless device 202 may include a processor, a memory device, a transceiver, or a combination thereof.

As described with regard to FIGS. 2-5, a master AP triggers each wireless device in a system sequentially. A master AP, as used herein, may refer to an AP that manages the exchange of carrier path loss values between wireless devices. One function of the master AP is to send a signal to a wireless device prompting the wireless device to transmit one or more pulses associated with carrier path loss values. The signal prompting the wireless device may be considered a trigger signal. The trigger signal may indicate an identifier of a wireless device (e.g., a triggered device), such as a media access control address, that is to transmit pulses in response to the trigger signal. A triggered wireless device may transmit one or more full-amplitude pulses to other wireless devices in the system. In some examples, as explained further below, STAs within a BSS are triggered simultaneously. Each triggered wireless device may also transmit coded-amplitude pulses based on amplitudes of full-amplitude pulses received by that device. The trigger signal may be received by each wireless device in the system. Since the trigger signal may identify the triggered wireless device, the wireless devices may determine a sender of a pulse based on the trigger signal that precedes the pulse.

Figure 2:
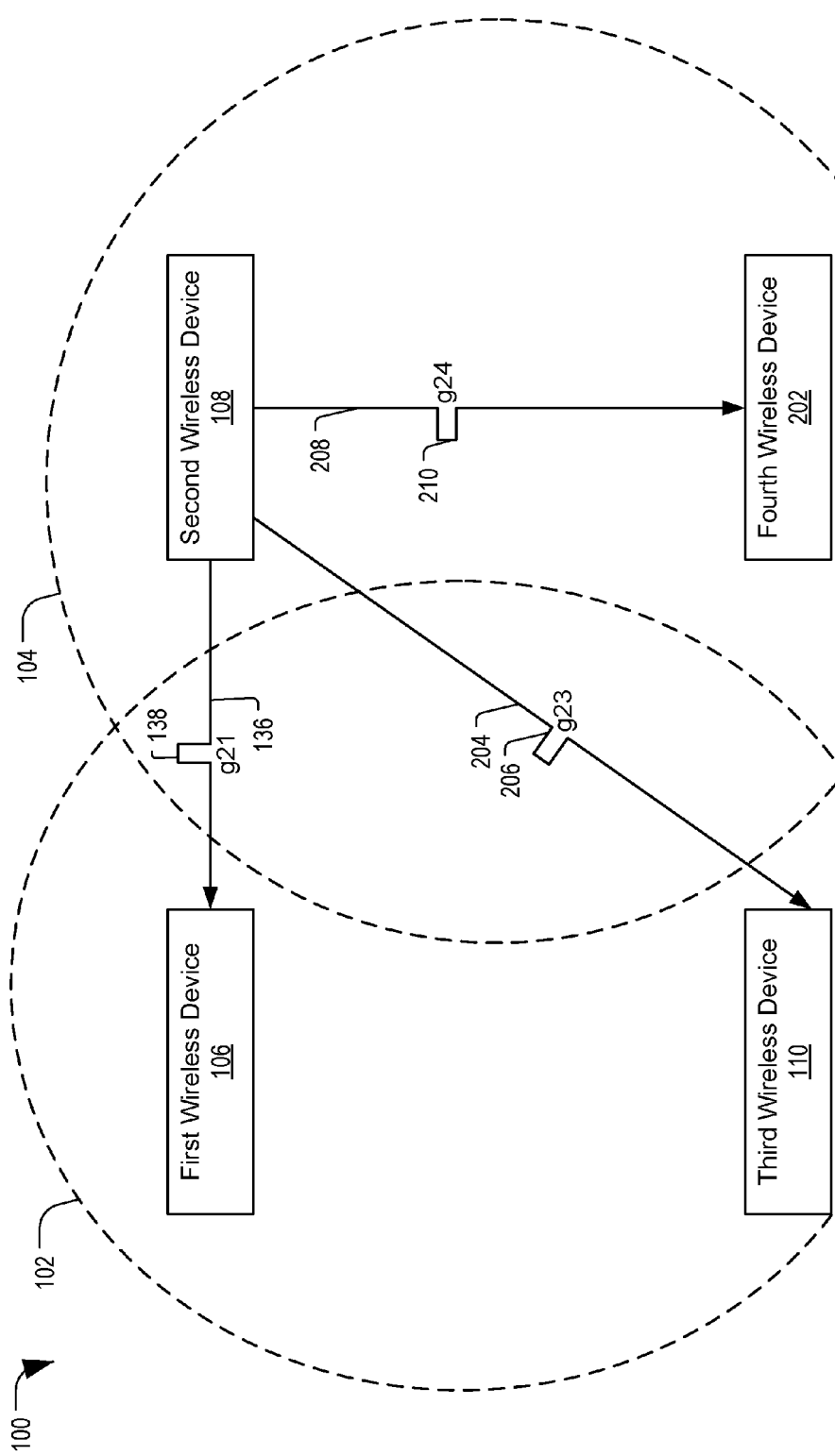
FIG. 2 is a diagram illustrating an example of a first stage of interactions of devices exchanging interference values.

The second wireless device 108 may correspond to an AP of the second BSS 104. In FIG. 2, the second wireless device 108 act as a master AP. The first wireless device 106 may correspond to an AP of the first BSS 102. The wireless devices 110, 202 may correspond to STAs.

It should be noted that the operations illustrated in FIGS. 2-5 may be performed by systems that include different configurations than what is illustrated. For example, systems may include a different number of overlapping BSSs, a different number of wireless devices in the BSSs, or a combination thereof. Each BSS may not include the same number of wireless devices.

Referring to FIG. 2, a diagram illustrating a first stage of interactions between devices is shown. As shown in FIG. 2, the second wireless device 108 transmits the first signal 136 to the first wireless device 106 including the first full-amplitude pulse 138. Accordingly, the first wireless device 106 may determine and store g21, as described above. In addition, the second wireless device 108 transmits a third signal 204 including a third full-amplitude pulse 206 to the third wireless device 110. The third wireless device 110 may determine and store a carrier path loss value, g23, for carrier path loss between the second wireless device 108 and the third wireless device 110 based on an amplitude of the third full-amplitude pulse 206 as received by the third wireless device 110. The second wireless device 108 may further transmit a fourth signal 208 including a fourth full-amplitude pulse 210 to the fourth wireless device 202. The fourth wireless device 202 may determine a carrier path loss value, g24, for carrier path loss between the second wireless device 108 and the fourth wireless device 202 based on an amplitude of the fourth full-amplitude pulse 210 as received by the fourth wireless device 202. Thus, each of the wireless devices 106, 110, and 202 may store a carrier path loss value indicating carrier path loss between that wireless device and the second wireless device 108. Since g21 and g23 indicate carrier path loss between wireless devices of different BSSs, g21 and g23 may be referred to as interference values.

In some examples, the second wireless device 108 broadcasts a trigger signal (not shown) to the other wireless devices 106, 110, and 202 before transmitting the signals 136, 204, and 208. The trigger signal may indicate that the exchange of carrier path loss values is to begin. While illustrated as different signals, it should be noted that the signals 136, 204, and 208 may correspond to a single broadcast signal and that each of the full-amplitude pulses 138, 206, and 210 correspond to a single full-amplitude pulse of the single broadcast signal.

Figure 3:
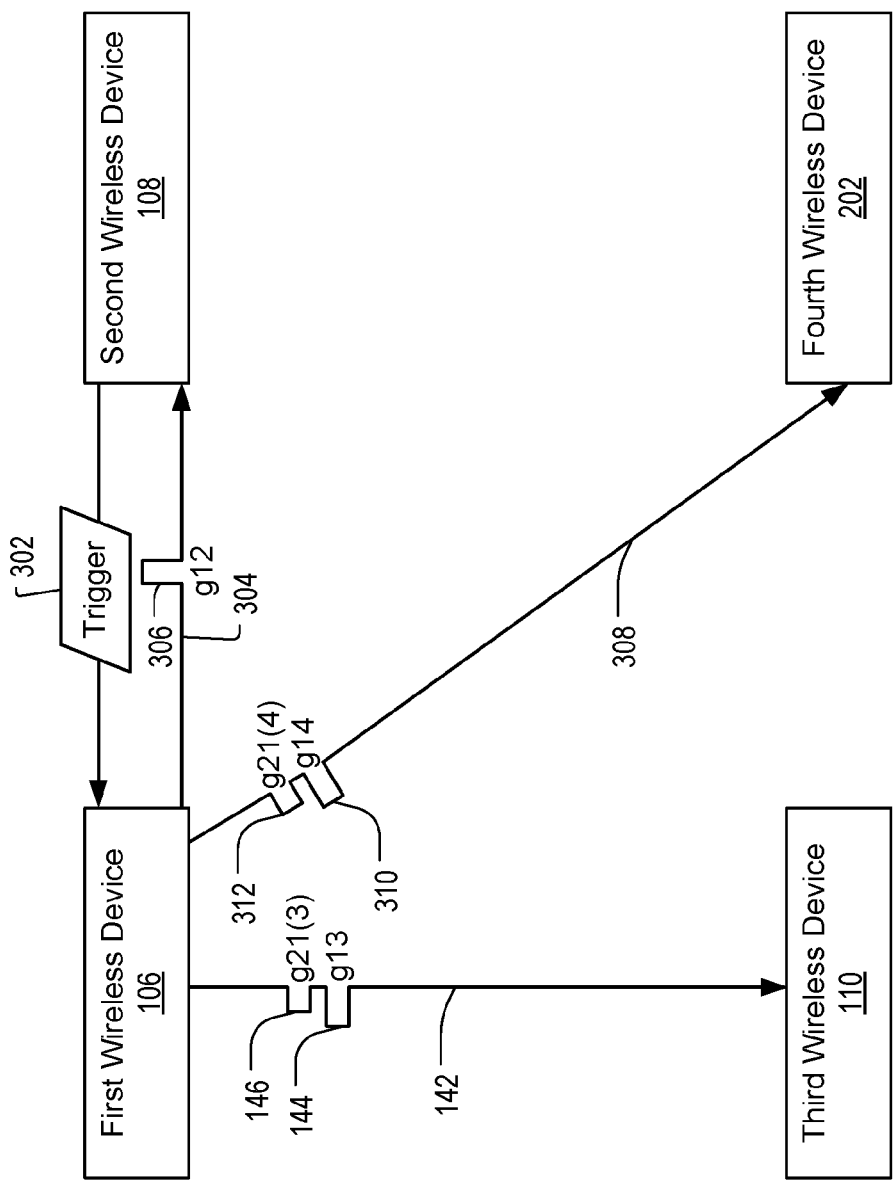
FIG. 3 is a diagram illustrating an example of a second stage of interactions of devices exchanging interference values.

Referring to FIG. 3, a second stage of interactions between devices is shown. The second stage may follow the first stage depicted in FIG. 2. The second wireless device 108, as the master AP, may transmit a first trigger signal 302 to the first wireless device 106. In response to the first trigger signal 302, the first wireless device 106 may transmit a fifth signal 304, a sixth signal 308, and the second signal 142. The first wireless device 106 may transmit the fifth signal 304 including a fifth full-amplitude pulse 306 to the second wireless device 108. Based on an amplitude of the fifth full-amplitude pulse 306 as received by the second wireless device 108, the second wireless device 108 may determine a carrier path loss value, g12, for carrier path loss between the first wireless device 106 and the second wireless device 108.

The first wireless device 106 may transmit the second signal 142, including the second full-amplitude pulse 144 and the coded-amplitude pulse 146, to the third wireless device 110. As described above, the third wireless device 110 may determine the second carrier path loss value, g13, based on the amplitude of the second full-amplitude pulse 144 as received by the third wireless device 110. The third wireless device 110 may further determine g21(3) (the carrier loss value g21 as perceived by the third wireless device 110) based on the difference or the ratio between the amplitude of the second full-amplitude pulse 144 as received by the third wireless device 110 and the amplitude of the coded-amplitude pulse 146 as received by the third wireless device 110, as described above.

The first wireless device 106 may transmit the sixth signal 308, including a sixth full-amplitude pulse 310 and a second coded-amplitude pulse 312, to the fourth wireless device 202. The first wireless device 106 may generate the second coded-amplitude pulse 312 based on the carrier path loss value g21 and the largest available amplitude. For example, the first wireless device 106 may use the lookup table 117 of FIG. 1 to determine an amplitude of the second coded-amplitude pulse 312, as described above.

The fourth wireless device 202 may determine a carrier path loss value, g14, for carrier path loss between the first wireless device 106 and the fourth wireless device 202 based on an amplitude of the sixth full-amplitude pulse 310 as received by the fourth wireless device 202. The fourth wireless device 202 may similarly determine a carrier path loss value, g21(4), for carrier path loss between the first wireless device 106 and the second wireless device 108, as perceived by the fourth wireless device 202. The fourth wireless device 202 may determine g21(4) based on a difference or a ratio between the amplitude of the sixth full-amplitude pulse 310 as received by the fourth wireless device 202 and an amplitude of the second coded-amplitude pulse 312 as received by the fourth wireless device 202.

In some examples, the signals 142, 304, and 308 correspond to a single broadcast signal, the full-amplitude pulses 144, 306, and 310 correspond to a single pulse, and the coded-amplitude pulses 146, 312 correspond to a single pulse. For example, the full-amplitude pulses 144, 306, and 310 may correspond to a single FPT of an OFDM symbol, and the coded-amplitude pulses 146, 312 may correspond to a single CAT of an OFDM symbol. In such examples, a wireless device may ignore pulses that are not relevant to the wireless device. For example, the second wireless device 108 may ignore a coded-amplitude pulse corresponding to the coded-amplitude pulses 146, 312. In some examples, wireless devices may store protocol information (e.g., rules) that indicates a sequence in which wireless devices are to transmit pulses, what frequency each wireless device is to use to transmit pulses, or a combination thereof. The wireless devices may be able to determine a sender of individual pulses (and whether to ignore the pulse) based on the protocol information.

Figure 4:
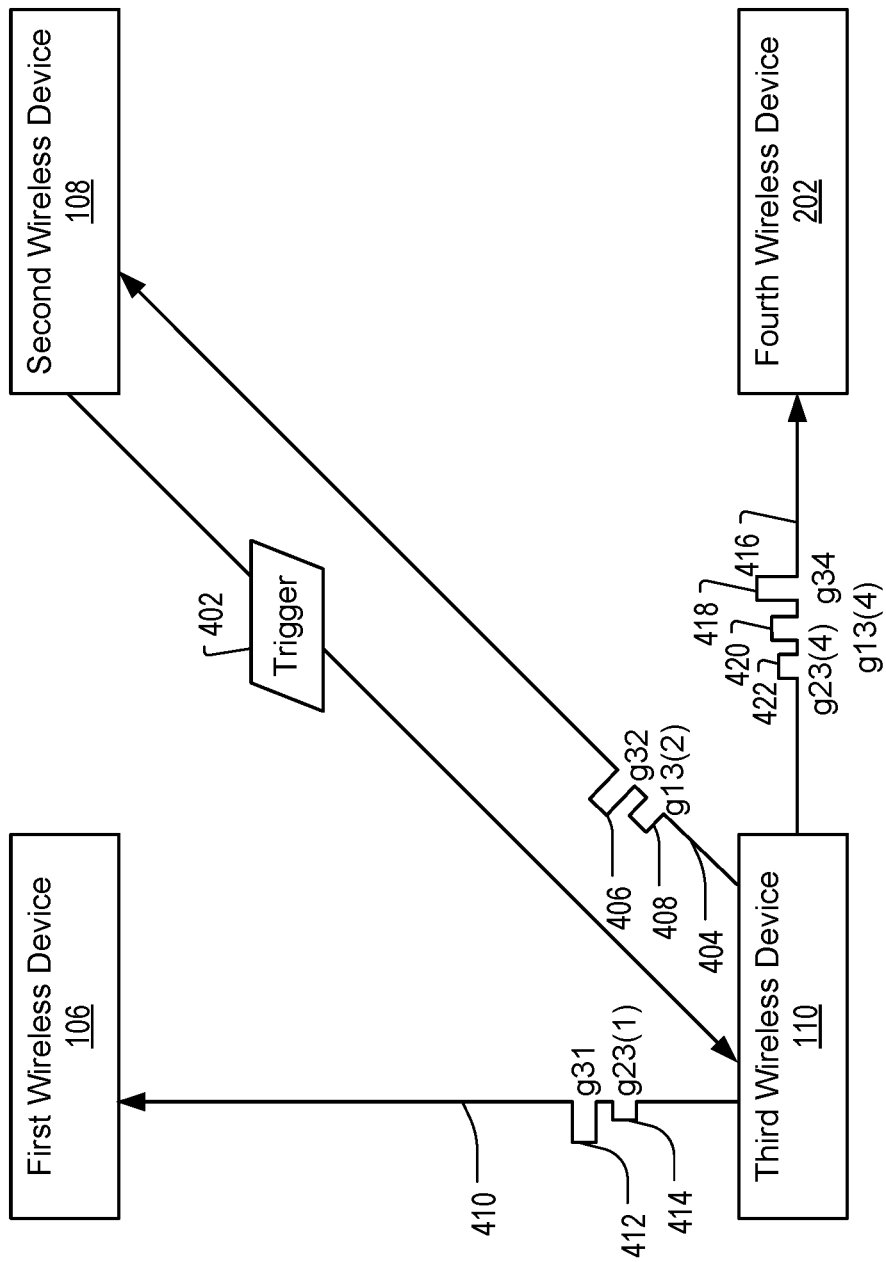
FIG. 4 is a diagram illustrating an example of a third stage of interactions of devices exchanging interference values.

Referring to FIG. 4, a third stage of interactions between wireless devices is shown. The third stage may follow the second stage depicted in FIG. 3. The second wireless device 108, as the master AP, may transmit a second trigger signal 402 to the third wireless device 110. In response to the second trigger signal 402, the third wireless device 110 may transmit a seventh signal 410, an eighth signal 404, and a ninth signal 416.

The third wireless device 110 may transmit the seventh signal 410, including a seventh full-amplitude pulse 412 and a third coded-amplitude pulse 414, to the first wireless device 106. The third wireless device 110 may generate the third coded-amplitude pulse 414 based on the carrier path loss value g23 and the largest available amplitude. For example, the third coded-amplitude pulse 414 may be generated using a lookup table, such as the lookup table 117, as described above. The first wireless device 106 may determine a carrier path loss value, g31, for carrier path loss between the third wireless device 110 and the first wireless device 106 based on an amplitude of the seventh full-amplitude pulse 412 as received by the first wireless device 106. The first wireless device 106 may similarly determine a carrier path loss value, g23(1), for carrier path loss between the second wireless device 108 and the third wireless device 110, as perceived by the first wireless device 106. The first wireless device 106 may determine g23(1) based on a difference or a ratio between the amplitude of the seventh full-amplitude pulse 412 as received by the first wireless device 106 and an amplitude of the third coded-amplitude pulse 414 as received by the first wireless device 106.

The third wireless device 110 may transmit the eighth signal 404, including an eighth full-amplitude pulse 406 and a fourth coded-amplitude pulse 408, to the second wireless device 108. The third wireless device 110 may generate the fourth coded-amplitude pulse 408 based on the carrier path loss value g13 and the largest available amplitude. For example, the third wireless device 110 may generate the fourth coded-amplitude pulse 408 using a lookup table, such as the lookup table 117, as described above. The second wireless device 108 may determine a carrier path loss value, g32, for carrier path loss between the third wireless device 110 and the second wireless device 108 based on an amplitude of the eighth full-amplitude pulse 406 as received by the second wireless device 108. The second wireless device 108 may similarly determine a carrier path loss value, g13(2), for carrier path loss between the first wireless device 106 and the third wireless device 110, as perceived by the second wireless device 108. The second wireless device 108 may determine g13(2) based on a difference or a ratio between the amplitude of the eighth full-amplitude pulse 406 as received by the second wireless device 108 and an amplitude of the fourth coded-amplitude pulse 408 as received by the second wireless device 108.

The third wireless device 110 may transmit the ninth signal 416, including a ninth full-amplitude pulse 418, a fifth coded-amplitude pulse 420, and a sixth coded-amplitude pulse 422, to the fourth wireless device 202. The third wireless device 110 may generate the fifth coded-amplitude pulse 420 based on the carrier path loss value g13 and the largest available amplitude. For example, the third wireless device 110 may generate the fifth coded-amplitude pulse 420 using a lookup table, such as the lookup table 117, as described above. The third wireless device 110 may generate the sixth coded-amplitude pulse 422 based on the carrier path loss value g23 and the largest available amplitude. For example, the third wireless device 110 may generate the sixth coded-amplitude pulse 422 using a lookup table, such as the lookup table 117, as described above. The fourth wireless device 202 may determine a carrier path loss value, g34, for carrier path loss between the third wireless device 110 and the fourth wireless device 202 based on an amplitude of the ninth full-amplitude pulse 418 as received at the fourth wireless device 202. The fourth wireless device 202 may similarly determine a carrier path loss value, g13(4), for carrier path loss between the first wireless device 106 and the third wireless device 110, as perceived by the fourth wireless device 202. The fourth wireless device 202 may determine g13(4) based on a difference or a ratio between the amplitude of the ninth full-amplitude pulse 418 as received at the fourth wireless device 202 and an amplitude of the fifth coded-amplitude pulse 420 as received at the fourth wireless device 202. Further, the fourth wireless device 202 may determine a carrier path loss value, g23(4), for carrier path loss between the second wireless device 108 and the third wireless device 110, as perceived by the fourth wireless device 202. The fourth wireless device 202 may determine g23(4) based on a difference or a ratio between the received amplitude of the ninth full-amplitude pulse 418 as received at the fourth wireless device 202 and an amplitude of the sixth coded-amplitude pulse 422 as received at the fourth wireless device 202.

In some implementations, the signals 404, 410, and 416 correspond to a single broadcast signal, the full-amplitude pulses 406, 412, and 418 correspond to a single pulse, the coded-amplitude pulses 408, 420 correspond to a single pulse, and the coded-amplitude pulses 414, 422 correspond to a single pulse. For example, the full-amplitude pulses 406, 412, and 418 may correspond to a single FPT of a first OFDM symbol, the coded-amplitude pulses 408, 420 may correspond to a first CAT of a second OFDM symbol, and the coded-amplitude pulses 414, 422 may correspond to a second CAT of a third OFDM symbol. In such examples, a wireless device may ignore pulses that are not relevant to the wireless device. For example, the first wireless device 106 may ignore a coded-amplitude pulse corresponding to the coded-amplitude pulses 408, 420. Wireless devices may store protocol information that indicates which pulses are to be included in a broadcast signal and in what order the pulses are to be transmitted. Alternatively, the second trigger signal 402 may indicate what pulses are to be transmitted and in what order the pulses are to be transmitted. The second trigger signal 402 may be received by each of the wireless devices 106, 110, 202.

Figure 5:
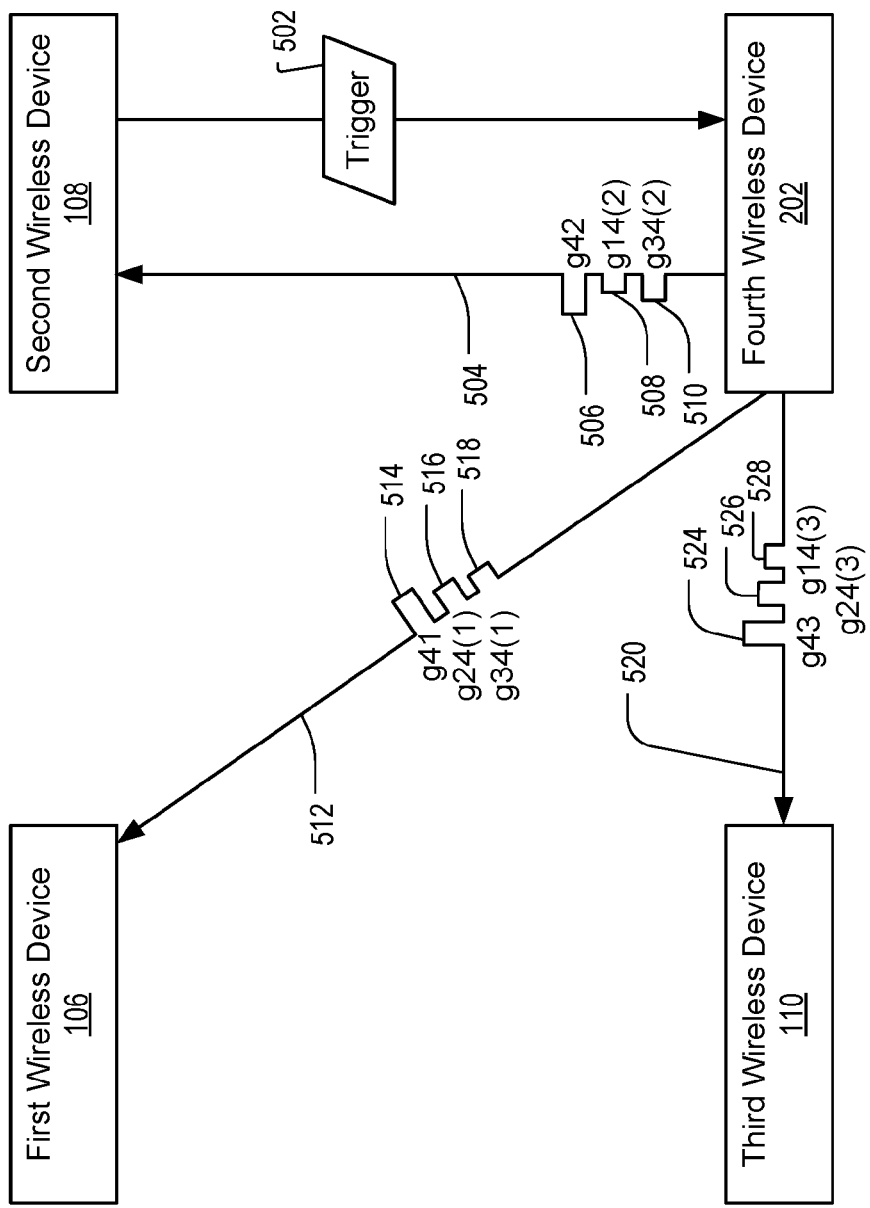
FIG. 5 is a diagram illustrating an example of a fourth stage of interactions of devices exchanging interference values.

Referring to FIG. 5, a fourth stage of interactions between devices is shown. The fourth stage may follow the third stage depicted in FIG. 5. The second wireless device 108, as the master wireless AP, may transmit a third trigger signal 502 to the fourth wireless device 202. In response to the third trigger signal 502, the fourth wireless device 202 may transmit a tenth signal 504, an eleventh signal 512, and a twelfth signal 520.

The fourth wireless device 202 may transmit the tenth signal 504, including a tenth full-amplitude pulse 506, a seventh coded-amplitude pulse 508, and an eighth coded-amplitude pulse 510, to the second wireless device 108. The fourth wireless device 202 may generate the seventh coded-amplitude pulse 508 based on the carrier path loss value g14 and the largest available amplitude. For example, the fourth wireless device 202 may generate the seventh coded-amplitude pulse 508 using a lookup table, such as the lookup table 117, as described above. The fourth wireless device 202 may generate the eighth coded-amplitude pulse 510 based on the carrier path loss value g34 and the largest available amplitude. For example, the fourth wireless device 202 may generate the eighth coded-amplitude pulse 510 using a lookup table, such as the lookup table 117, as described above. The second wireless device 108 may determine a carrier path loss value, g42, for carrier path loss between the fourth wireless device 202 and the second wireless device 108 based on an amplitude of the tenth full-amplitude pulse 506 as received by the second wireless device 108. The second wireless device 108 may similarly determine a carrier path loss value, g14(2), for carrier path loss between the first wireless device 106 and the fourth wireless device 202, as perceived by the second wireless device 108. The second wireless device 108 may determine g14(2) based on a difference or a ratio between the amplitude of the tenth full-amplitude pulse 506 as received by the second wireless device 108 and an amplitude of the seventh coded-amplitude pulse 508 as received by the second wireless device 108. Further, the second wireless device 108 may determine a carrier path loss value, g34(2), for carrier path loss between the third wireless device 110 and the fourth wireless device 202, as perceived by the second wireless device 108. The second wireless device 108 may determine g34(2) based on a difference or a ratio between the amplitude of the tenth full-amplitude pulse 506 as received by the second wireless device 108 and an amplitude of the eighth coded-amplitude pulse 510 as received by the second wireless device 108.

The fourth wireless device 202 may transmit the eleventh signal 512, including an eleventh full-amplitude pulse 514, a ninth coded-amplitude pulse 516, and a tenth coded-amplitude pulse 518, to the first wireless device 106. The fourth wireless device 202 may generate the ninth coded-amplitude pulse 516 based on the carrier path loss value g24 and the largest available amplitude. For example, the fourth wireless device 202 may generate the ninth coded-amplitude pulse 516 using a lookup table, such as the lookup table 117, as described above. The fourth wireless device 202 may generate the tenth coded-amplitude pulse 518 based on the carrier path loss value g34 and the largest available amplitude. For example, the fourth wireless device 202 may generate the tenth coded-amplitude pulse 518 using a lookup table, such as the lookup table 117, as described above. The first wireless device 106 may determine a carrier path loss value, g41, for carrier path loss between the fourth wireless device 202 and the first wireless device 106 based on an amplitude of the eleventh full-amplitude pulse 514 as received by the first wireless device 106. The first wireless device 106 may similarly determine a carrier path loss value, g24(1), for carrier path loss between the second wireless device 108 and the fourth wireless device 202, as perceived by the first wireless device 106. The first wireless device 106 may determine g24(1) based on a difference or a ratio between the amplitude of the eleventh full-amplitude pulse 514 as received by the first wireless device 106 and an amplitude of the ninth coded-amplitude pulse 516 as received by the first wireless device 106. Further, the first wireless device 106 may determine a carrier path loss value, g34(1), for carrier path loss between the third wireless device 110 and the fourth wireless device 202, as perceived by the first wireless device 106. The first wireless device 106 may determine g34(1) based on a difference or a ratio between the amplitude of the eleventh full-amplitude pulse 514 as received by the first wireless device 106 and an amplitude of the tenth coded-amplitude pulse 518 as received by the first wireless device 106.

The fourth wireless device 202 may transmit the twelfth signal 520, including a twelfth full-amplitude 524, an eleventh coded-amplitude pulse 526, and a twelfth coded-amplitude pulse 528, to the third wireless device 110. The fourth wireless device 202 may generate the eleventh coded-amplitude pulse 526 based on the carrier path loss value g24 and the largest available amplitude. For example, the fourth wireless device 202 may generate the eleventh coded-amplitude pulse 526 using a lookup table, such as the lookup table 117, as described above. The fourth wireless device 202 may generate the twelfth coded-amplitude pulse 528 based on the carrier path loss value g14 and the largest available amplitude. For example, the fourth wireless device 202 may generate the twelfth coded-amplitude pulse 528 using a lookup table, such as the lookup table 117, as described above. The third wireless device 110 may determine a carrier path loss value, g43, for carrier path loss between the fourth wireless device 202 and the third wireless device 110 based on an amplitude of the twelfth full-amplitude pulse 524 as received by the third wireless device 110. The third wireless device 110 may similarly determine a carrier path loss value, g24(3), for carrier path loss between the second wireless device 108 and the fourth wireless device 202, as perceived by the third wireless device 110. The first wireless device 106 may determine g24(3) based on a difference or a ratio between the amplitude of the twelfth full-amplitude pulse 524 as received by the third wireless device 110 and an amplitude of the eleventh coded-amplitude pulse 526 as received by the third wireless device 110. Further, the third wireless device 110 may determine a carrier path loss value, g14(3), for carrier path loss between the first wireless device 106 and the fourth wireless device 202, as perceived by the third wireless device 110. The third wireless device 110 may determine g14(3) based on a difference or a ratio between the amplitude of the twelfth full-amplitude pulse 524 as received by the third wireless device 110 and an amplitude of the twelfth coded-amplitude pulse 528 as received by the third wireless device 110.

In some implementations, the signals 504, 512, 520 correspond to a single broadcast signal, the full-amplitude pulses 506, 514, and 524 (e.g., a single FPT of an OFDM symbol) correspond to a single pulse, the coded-amplitude pulses 508, 528 correspond to a single pulse, the coded-amplitude pulses 510, 518 correspond to a single pulse, and the coded-amplitude pulses 516, 526 correspond to a single pulse. For example, the full-amplitude pulses 506, 514, and 524 may correspond to a single FPT of a first OFDM symbol, the coded-amplitude pulses 508, 528 may correspond to a first CAT of a second OFDM symbol, and the coded-amplitude pulses 516, 526 may correspond to a second CAT of a third OFDM symbol. In such examples, a wireless device may ignore pulses that are not relevant to the wireless device. For example, the second wireless device 108 may ignore a coded-amplitude pulse corresponding to the coded-amplitude pulses 516, 526. Wireless devices may store protocol information that indicates which pulses are to be included in a broadcast signal and in what order the pulses are to be transmitted. Alternatively, the third trigger signal 502 may indicate what pulses are to be transmitted as and in what order the pulses are to be transmitted. The third trigger signal 502 may be received by each of the wireless devices 106, 110, and 202.

STAs within a BSS may not communicate with each other directly and may not interfere with each other by virtue of using separate channels. Due to the use of separate communication channels, wireless devices do not characterize communication paths to other wireless devices in the same BSS. Accordingly, in some examples of the interactions illustrated in FIGS. 2-5, triggered STAs do not transmit full-amplitude pulses to other STAs in the same BSS or the other STAs in the same BSS ignore the full-amplitude pulses from wireless devices in the same BSS. Additionally, STAs within a BSS may not determine carrier path loss experienced by other STAs within the same BSS. Accordingly, in some examples, triggered STAs do not transmit coded-amplitude pulses to other STAs in the same BSS or the other STAs in the same BSS ignore the coded-amplitude pulses from wireless devices in the same BSS.

Mobile devices that receive (and do not ignore) the full-amplitude pulses and the coded-amplitude pulses may determine carrier loss values gij and gij(k), as explained above. Once the interactions illustrated in FIGS. 2-5 are completed, wireless devices in the system may store a plurality of carrier path loss values. The carrier path loss values stored across the system may be known as an inter-BSS interference (IBI) matrix. In some implementations, every wireless device stores carrier path loss values associated with communication between every pairing of the wireless devices in the system. In other implementations, the IBI matrix may include fewer elements. For example, as explained above, links between STAs of a single BSS may not be characterized and STAs within a single BSS may store carrier path loss information related to other STAs within the BSS. In general, a number of carrier path loss values stored across a system after the interactions of FIGS. 2-5 are performed may be on the order of $O(N^3L^2)$, where N is a number of overlapping BSSs in the system and L is a number of nodes per BSS. As explained above, the carrier path loss values stored across the system may be known as an IBI matrix.

After the fourth stage of the interactions illustrated in FIG. 5 has been completed, the first wireless device 106 may store g21, g31, g23(1), g41, g24(1), and g34(1). The second wireless device 108 may store g12, g32, g13(2), g42, g14(2), and g34(2). The third wireless device 110 may store g23, g13, g21(3), g43, g24(3), and g14(3). The fourth wireless device 202 may store g24, g14, g21(4), g34, g13(4), and g23(4).

Using the interactions between wireless devices illustrated in FIGS. 2-5, wireless devices may exchange a large number of carrier path loss values more quickly than by using other protocols. Wireless devices may use carrier path loss values to determine whether to enable parallel use of a channel by overlapping BSSs, as described further below.

Figure 6:
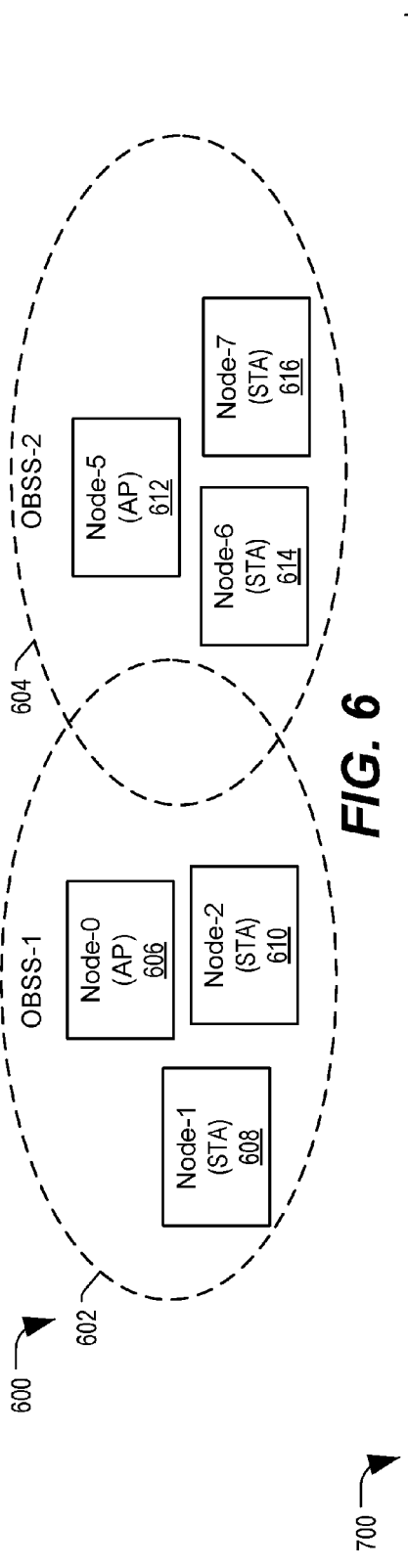
FIG. 6 is a diagram of an example of a system that supports inter-basic service set interference characterization.

Referring to FIG. 6 a diagram of a system 600 that supports inter-BSS interference characterization is shown. The system 600 includes a first BSS 602 (overlapping BSS-1) and a second BSS 604 (overlapping BSS-2). The first BSS 602 includes a node-0 606, a node-1 608, and a node-2 610. The second BSS 604 includes a node-5 612, a node-6 614, and a node-7 616. The nodes 606-616 may correspond to wireless devices, such as the wireless devices 106-110 shown in FIG. 1. Accordingly, each of the nodes 606-616 may include components, such as those included in the wireless devices 106-110. The node-0 606 may correspond to or operate as a master AP. The node-5 612 may correspond to or operate as an AP. The node-1 608, the node-2 610, the node-6 614, and the node-7 616 may correspond to or operate as STAs.

Figure 7:
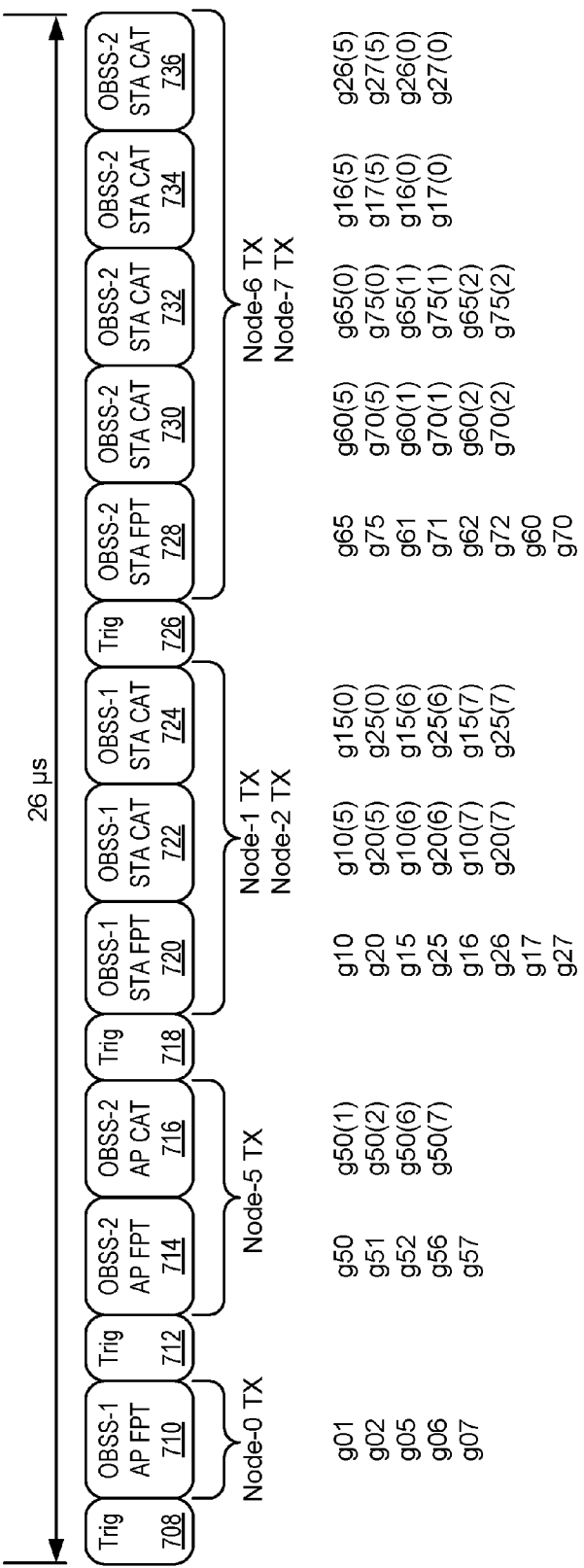
FIG. 7 is a timeline illustrating an example of interactions of devices exchanging interference values.

Thus, the system 600, as illustrated, includes 2 overlapping BSSs that each includes 3 wireless devices. With reference to FIGS. 6 and 7, carrier path loss values may be denoted in the format gij, where gij is the carrier path loss g from wireless device-i to wireless device-j. Device-0 may correspond to the node-0 606, device-1 may correspond to the node-1 608, device-2 may correspond to the node-2 610, etc. As described above, an IBI matrix may include up to $N^3L^2$ elements, where N is a number of overlapping BSSs in the system and L is a number of nodes per BSS. Since the system 600 includes 2 overlapping BSSs that each have 3 nodes, an IBI matrix for the system 600 may include up to 72 elements. The 72 elements may be exchanged in $O(N^3L^2)$ units of time.

Referring to FIG. 7, a timeline 700 illustrating particular interactions between the nodes 606-616 of the system 600 to perform inter-BSS interference characterization are shown. The particular interactions shown in FIG. 7 illustrate how inter-BSS interference characterization may be performed in $O(N^2+NL)$ time rather than $O(N^3L^2)$ time. In particular implementations, inter-BSS interference characterization may be performed in less than 10 milliseconds (ms). In some implementations, inter-BSS interference characterization is performed periodically to refresh the IBI matrix.

According to the implementation depicted in FIG. 7, during inter-BSS interference characterization, each transmitting wireless device may transmit a single pulse at a time. In the illustrated example, each transmitting wireless device transmits a single tone of an OFDM symbol using an assigned subcarrier frequency. Each tone may correspond to an FPT, a CAT, or a trigger tone. FPTs may correspond to full-amplitude pulses, CATs may correspond to coded-amplitude pulses, and trigger tones may correspond to trigger signals, such as the trigger signals 302, 402, and 502. In alternative implementations, techniques other than ODFM may be used to support simultaneous transmission of a tone by multiple devices. For example, multi-user, multiple-input, and multiple-output (MU-MIMO) technologies may be used to support simultaneous transmission of a tone. In some examples, orthogonal frequency division multiple access (OFDMA) is used to support per-tone IBI matrix transmission.

IBI matrix characterization may be performed according to rules stored by each wireless device involved. For example, each of the nodes 606-616 may store rules associated with IBI matrix characterization. The rules may be preconfigured (e.g., generated and stored) by a network administrator or negotiated by the devices. The rules may include a designation of a master AP, an order in which wireless devices respond to trigger tones, subcarrier assignments, a largest available amplitude, one or more lookup tables, such as the lookup table 117, that associate indices with carrier path loss values, or a combination thereof.

In the example illustrated in FIG. 7, each STA in a BSS may transmit simultaneously. For example, each STA in a BSS may transmit simultaneously as part of one OFDM symbol. Since each STA in a BSS transmits simultaneously, a number of FPT symbols used to characterize the IBI matrix may not be dependent on a number of STAs in each BSS.

Further, a number of CAT symbols used to characterize the IBI matrix may be reduced as compared to implementations where only one STA transmits a CAT symbol at a time. In the illustrated example, $2N^2+(N-1)L$ symbols (excluding trigger tones) may be used to characterize the IBI matrix of the system 600. Thus, time used to perform inter-BSS interference characterization may be $O(N^2+NL)$ time units rather than $O(N^3L^2)$ time units. In the illustrated example, a symbol length of 2.0 microseconds (μs) is shown for FPTs and CATs (e.g., 1.6 μs for the tone and 0.4 μs for a cyclic prefix) and 1.0 μs for trigger tones. In FIG. 7, four trigger tones, four FPTs, and seven CATs are illustrated for the system 600 that includes 2 overlapping BSSs. Therefore, as illustrated in FIG. 7, the IBI matrix of the system 600 may be characterized in (4×1)+2(4+7)=26 μs.

In some implementations, IBI matrix characterization may be performed following a distributed coordination function (DCF) interframe space (DIFS) as used in various IEEE 802.11 protocols. IBI matrix characterization is initiated by the master AP (e.g., the node-0 606) transmitting a first trigger tone as part of a first trigger symbol 708. The node-0 606 may transmit the first trigger tone on a subcarrier assigned to the node-0 606. The assignment of the subcarrier to the node-0 606 may be based on a rule stored by the nodes 606-616. The subcarrier assigned to the node-0 606 may be 9.375 megahertz (Mhz). Each of the nodes 608-616 may receive the first trigger tone. The first trigger tone may signal to the nodes 608-616 that the node-0 606 is initiating characterization of the IBI matrix for system 600. Following transmission of the first trigger symbol 708, the node-0 606 may transmit a first FPT as part of an overlapping BSS-1 (OBSS-1) AP FPT symbol 710. The first FPT may be transmitted on the subcarrier assigned to the node-0 606. The node-1 608, the node-2 610, the node-5 612, the node-6 614, and the node-7 616 may receive the first FPT and determine, based on received amplitudes of the first FPT, g01, g02, g05, g06, and g07, respectively.

Following transmission of the overlapping BSS-1 AP FPT symbol 710, the node-0 606 may transmit a second trigger tone as part of a second trigger symbol 712. The second trigger tone may be transmitted on the subcarrier assigned to the node-0 606. The second trigger tone may indicate or identify the node-5 612. In some examples, a rule stored by the nodes 606-616 associates the node-5 612 with the second trigger tone. In response to receipt of the second trigger tone, the node-5 612 may transmit a second FPT as part of an overlapping BSS-2 AP FPT symbol 714. The second FPT may be transmitted on a subcarrier assigned to the node-5 612. For example, the subcarrier assigned to the node-5 612 may be 8.75 Mhz. The node-0 606, the node-1 608, the node-2, 610, the node-6 614, and the node-7 616 may receive the second FPT and determine, based on received amplitudes of the second FPT, g50, g51, g52, g56, and g57, respectively.

Further, in response to receipt of the second trigger tone, the node-5 612 may transmit a first CAT as part of an overlapping BSS-2 AP CAT symbol 716. The first CAT may be transmitted on the subcarrier assigned to the node-5 612. An amplitude of the first CAT may be based on an amplitude of the first FPT, as received by the node-5 612. That is, the amplitude of the first CAT may indicate g50. The node-1 608, the node-2, 610, the node-6 614, and the node-7 616 may receive the first CAT and determine, based on ratios or differences between received amplitudes of the second FPT and the first CAT, g50(1), g50(2), g50(6), and g50(7), respectively. The node-0 606 may ignore the first CAT because g50 is the same as g50(0).

Following the overlapping BSS-2 AP CAT symbol 716, the node-0 606 may transmit a third trigger tone as part of a third trigger symbol 718. The third trigger tone may be transmitted on the subcarrier assigned to the node-0 606. The third trigger tone may indicate all nodes of the first BSS 602. For example, a rule stored by the nodes 606-616 may associate the node-1 608 and the node-2 610 with a third trigger tone transmitted during characterization of a particular IBI matrix (e.g., the third trigger tone). In response to the third trigger tone, the node-1 608 may transmit a third FPT and the node-2 610 may transmit a fourth FPT as part of an overlapping BSS-1 STA FPT symbol 720. The third FPT may be transmitted on a subcarrier assigned to the node-1 608, and the fourth FPT may be transmitted on a subcarrier assigned to the node-2 610. For example, the subcarrier assigned to the node-1 608 may be 9.375 Mhz. The subcarrier assigned to the node-2 610 may be 8.75 MHz. The node-0 606, the node-5 612, the node-6, 614, and the node-7 616 may receive the third FPT and determine, based on received amplitudes of the third FPT, g10, g15, g16, and g17, respectively. The node-0 606, the node-5 612, the node-6, 614, and the node-7 616 may receive the fourth FPT and determine, based on received amplitudes of the fourth FPT, g20, g25, g26, and g27, respectively. Since the third FPT and the fourth FPT are transmitted on different subcarriers, the node-0 606, the node-5 612, the node-6, 614, and the node-7 616 may receive the third FPT and the fourth FPT concurrently. In addition, the node-1 608 may ignore the fourth FPT and the node-2 610 may ignore the third FPT because links between nodes of the same BSS are not characterized.

Further, in response to receipt of the third trigger tone, the node-1 608 may transmit a second CAT and the node-2 610 may transmit a third CAT as part of a first overlapping BSS-1 STA CAT symbol 722. The second CAT may be transmitted on the subcarrier assigned to the node-1 608, and the third CAT may be transmitted on the subcarrier assigned to the node-2 610. An amplitude of the second CAT may be based on an amplitude of the first FPT, as received by the node-1 608. That is, the amplitude of the second CAT may indicate g10. Similarly, an amplitude of the third CAT may be based on an amplitude of the first FPT, as received by the node-2 610. That is, the amplitude of the third CAT may indicate g20. The node-5 612, the node-6 614, and the node-7 616 may receive the second CAT and determine, based on ratios or differences between received amplitudes of the third FPT and the second CAT, g10(5), g10(6), and g10(7), respectively. The node-5 612, the node-6 614, and the node-7 616 may receive the third CAT and determine, based on ratios or differences between received amplitudes of the fourth FPT and the third CAT, g20(5), g20(6), and g20(7), respectively. The node-0 606 may ignore the second CAT because g10 is the same as g10(0). The node-0 606 may ignore the third CAT because g20 is the same as g20(0). In addition, the node-1 608 may ignore the third CAT and the node-2 610 may ignore the second CAT because STAs within a BSS may not store carrier path loss values associated with other STAs in the BSS.

Further, in response to receipt of the third trigger tone, the node-1 608 may transmit a fourth CAT and the node-2 610 may transmit a fifth CAT as part of a second overlapping BSS-1 STA CAT symbol 724. The fourth CAT may be transmitted on the subcarrier assigned to the node-1 608, and the fifth CAT may be transmitted on the subcarrier assigned to the node-2 610. An amplitude of the fourth CAT may be based on an amplitude of the second FPT, as received by the node-1 608. That is, the amplitude of the fourth CAT may indicate g15. Similarly, an amplitude of the fifth CAT may be based on an amplitude of the second FPT, as received by the node-2 610. That is, the amplitude of the fifth CAT may indicate g25. The node-0 606, the node-6 614, and the node-7 616 may receive the fourth CAT and determine, based on ratios or differences between received amplitudes of the third FPT and the fourth CAT, g15(0), g15(6), and g15(7), respectively. The node-0 606, the node-6 614, and the node-7 616 may receive the fifth CAT and determine, based on ratios or differences between received amplitudes of the fourth FPT and the fifth CAT, g25(0), g25(6), and g25(7), respectively. The node-5 612 may ignore the fourth CAT because g15 is the same as g15(5). The node-5 612 may ignore the fifth CAT because g25 is the same as g25(5). In addition, the node-1 608 may ignore the fifth CAT and the node-2 610 may ignore the fourth CAT because STAs within a BSS may not store carrier path loss values associated with other STAs in the BSS.

Following transmission of the overlapping BSS-1 STA CAT symbol 724, the node-0 606 may transmit a fourth trigger tone as part of a fourth trigger symbol 726. The fourth trigger tone may be transmitted on the subcarrier assigned to the node-0 606. The fourth trigger tone may indicate all nodes of the second BSS 604. A rule stored by the nodes 606-616 may associate the node-6 614 and the node-7 616 with the fourth trigger tone (e.g., the rule may define a sequence of trigger tones associated with IBI matrix characterization). In response to receipt of the fourth trigger tone, the node-6 614 may transmit a fifth FPT and the node-7 616 may transmit a sixth FPT as part of an overlapping BSS-2 STA FPT symbol 728. The fifth FPT may be transmitted on a subcarrier assigned to the node-6 614, and the sixth FPT may be transmitted on a subcarrier assigned to the node-7 616. For example, the subcarrier assigned to the node-6 614 may be 9.375 MHz. The subcarrier assigned to the node-7 616 may be 8.75 MHz. The node-0 606, the node-1 608, the node-2, 610, and the node-5 612 may receive the fifth FPT and determine, based on received amplitudes of the fifth FPT, g60, g61, g62, and g65, respectively. The node-0 606, the node-1 608, the node-2, 610, and the node-5 612 may receive the sixth FPT and determine, based on received amplitudes of the sixth FPT, g70, g71, g72, and g75, respectively. Since the fifth FPT and the sixth FPT are transmitted on different subcarriers, the node-0 606, the node-1 608, the node-2, 610, and the node-5 612 may receive the fifth FPT and the sixth FPT concurrently. In addition, the node-6 614 may ignore the sixth FPT and the node-7 616 may ignore the fifth FPT because communication paths between nodes of the same BSS are not characterized.

Further, in response to receipt of the fourth trigger tone, the node-6 614 may transmit a sixth CAT and the node-7 616 may transmit a seventh CAT as part of a first overlapping BSS-2 STA CAT symbol 730. The sixth CAT may be transmitted on the subcarrier assigned to the node-6 614, and the seventh CAT may be transmitted on the subcarrier assigned to the node-7 616. An amplitude of the sixth CAT may be based on an amplitude of the first FPT, as received by the node-6 614. That is, the amplitude of the sixth CAT may indicate g60. Similarly, an amplitude of the seventh CAT may be based on an amplitude of the first FPT, as received by the node-7 616. That is, the amplitude of the seventh CAT may indicate g70. The node-1 608, the node-2 610, and the node-5 612 may receive the sixth CAT and determine, based on ratios or differences between received amplitudes of the fifth FPT and the sixth CAT, g60(1), g60(2), and g60(5), respectively. The node-1 608, the node-2

610, and the node-5 612 may receive the seventh CAT and determine, based on ratios or differences between received amplitudes of the sixth FPT and the seventh CAT, g70(1), g70(2), and g70(5), respectively. The node-0 606 may ignore the sixth CAT because g60 is the same as g60(0). The node-0 606 may ignore the seventh CAT because g70 is the same as g70(0). In addition, the node-6 614 may ignore the seventh CAT and the node-7 616 may ignore the sixth CAT because STAs within a BSS do not store carrier path loss values associated with other STAs in the BSS.

Further, in response to receipt of the fourth trigger tone, the node-6 614 may transmit an eighth CAT and the node-7 616 may transmit a ninth CAT as part of a second overlapping BSS-2 STA CAT symbol 732. The eighth CAT may be transmitted on the subcarrier assigned to the node-6 614, and the ninth CAT may be transmitted on the subcarrier assigned to the node-7 616. An amplitude of the eighth CAT may be based on an amplitude of the second FPT, as received by the node-6 614. That is, the amplitude of the eighth CAT may indicate g65. Similarly, an amplitude of the ninth CAT may be based on an amplitude of the second FPT, as received by the node-7 616. That is, the amplitude of the ninth CAT may indicate g75. The node-0 606, the node-1 608, and the node-2 610 may receive the eighth CAT and determine, based on ratios or differences between received amplitudes of the fifth FPT and the eighth CAT, g65(0), g65(1), and g65(2), respectively. The node-0 606, the node-1 608, and the node-2 610 may receive the ninth CAT and determine, based on ratios or differences between received amplitudes of the sixth FPT and the ninth CAT, g75(0), g75(1), and g75(2), respectively. The node-5 612 may ignore the eighth CAT because g65 is the same as g65(5). The node-5 612 may ignore the ninth CAT because g75 is the same as g75(5). In addition, the node-6 614 may ignore the ninth CAT and the node-7 616 may ignore the eighth CAT because STAs within a BSS do not store carrier path loss values associated with other STAs in the BSS.

Further, in response to receipt of the fourth trigger tone, the node-6 614 may transmit a tenth CAT and an eleventh CAT and the node-7 616 may transmit a twelfth CAT and a thirteenth CAT. The tenth CAT and the twelfth CAT may be transmitted as part of a third overlapping BSS-2 STA CAT symbol 734. The eleventh CAT and the thirteenth CAT may be transmitted as part of a fourth overlapping BSS-2 STA CAT symbol 736. The tenth CAT and the eleventh CAT may be transmitted on the subcarrier assigned to the node-6 614, and the twelfth CAT and the thirteenth CAT may be transmitted on the subcarrier assigned to the node-7 616. An amplitude of the tenth CAT may be based on an amplitude of the third FPT, as received by the node-6 614. That is, the amplitude of the tenth CAT may indicate g61. An amplitude of the eleventh CAT may be based on an amplitude of the fourth FPT, as received by the node-6 614. That is, the amplitude of the tenth CAT may indicate g62. An amplitude of the twelfth CAT may be based on an amplitude of the third FPT, as received by the node-7 616. That is, the amplitude of the twelfth CAT may indicate g71. An amplitude of the thirteenth CAT may be based on an amplitude of the fourth FPT, as received by the node-7 616. That is, the amplitude of the thirteenth CAT may indicate g72. The node-0 606 and the node-5 612 may receive the tenth CAT and determine, based on ratios or differences between received amplitudes of the fifth FPT and the tenth CAT, g16(0) and g16(5), respectively. The node-0 606 and the node-5 612 may receive the eleventh CAT and determine, based on ratios or differences between received amplitudes of the fifth FPT and the eleventh CAT, g26(0) and g26(5), respectively. The node-0 606 and the node-5 612 may receive the twelfth CAT and determine, based on ratios or differences between received amplitudes of the sixth FPT and the twelfth CAT, g26(0) and g26(5), respectively. The node-0 606 and the node-5 612 may receive the thirteenth CAT and determine, based on ratios or differences between received amplitudes of the sixth FPT and the thirteenth CAT, g27(0) and g27(5), respectively. The node-1 608 and the node-2 610 may ignore the tenth CAT, the eleventh CAT, the twelfth CAT, and the thirteenth CAT. In addition, the node-6 614 may ignore the ninth CAT and the node-7 616 may ignore the eighth CAT because STAs within a BSS do not store carrier path loss values associated with other STAs in the BSS.

After receipt of the third overlapping BSS-2 STA CAT symbol 734, the node-0 606 may store g50, g10, g20, g15(0), g25(0), g60, g70, g65(0), g75(0), g16(0), g17(0), g26(0), and g27(0). The node-1 608 may store g01, g51, g50(1), g61, g71, g60(1), g70(1), g65(1), and g75(1). The node-2 610 may store g02, g52, g50(2), g62, g72, g60(2), g70(2), g65(2), and g75(2). The node-5 612 may store g05, g15, g25, g10(5), g20(5), g65, g75, g60(5), g70(5), g16(5), g17(5), g26(5), and g27(5). The node-6 614 may store g06, g56, g50(6), g16, g26, g10(6), g20(6), g15(6), and g25(6). The node-7 may store g07, g57, g50(7), g17, g27, g10(7), g20(7), g15(7), and g25(7). Thus, by storing carrier path loss values, the nodes 606-616 may characterize an IBI matrix of the system 600. Since each STA in a BSS transmits FPTs and CATs simultaneously, a number of symbols needed to completely characterize the IBI matrix may be less than if each wireless device transmits during a symbol dedicated to that wireless device. Accordingly, FIG. 7 illustrates a technique of IBI matrix characterization that may be faster than other techniques. For example, an IBI matrix may be characterized, as described with reference to FIG. 7, in $O(N^2+NL)$ time rather than $O(N^3L^2)$ time.

Once the IBI matrix for a system has been characterized, a wireless device may use the IBI matrix to determine whether to enable parallel use of a channel that is occupied by another wireless device in an overlapping BSS. For example, the node-0 606, when attempting to transmit data to the node-1 608 via a channel A, may determine that the node-5 612 is transmitting data to the node-6 614 via the channel A. Rather than backing off, the node-0 606 may use the IBI matrix characterized as shown in FIG. 7 to determine whether to transmit data via the channel A in parallel with the node-5 612. The node-0 606 may determine a signal-to-interference-plus-noise ratio (SINR) of a signal transmitted to the node-1 608 based on the IBI matrix. To illustrate, a SINR (as computed at the node-0 606) of a signal transmitted from the node-0 606 to the node-1 608 over a channel that the node-5 612 is transmitting over ("SINR-1") may be $$\frac{\frac{s0}{g01}}{\frac{s5}{g51(0)}},$$

where s0 is a transmit power of the node-0 606 and s5 is a transmit power of the node-5 612. In some examples, parallel transmission over a channel is enabled when a wireless device detects that a SINR exceeds a threshold. For example, the node-0 606 may transmit in parallel with the node-5 612 in response to determining that the SINR-1 is greater than a modulation and coding scheme (MCS) threshold. The MCS threshold may correspond to a throughput threshold. In some examples, a wireless device determines whether transmitting over a channel in parallel with another wireless device will disrupt a transmission of the other wireless device. For example, the node-0 606 may further determine a SINR of a signal transmitted from the node-5 612 to the node-6 614 over a channel that the node-0 606 is transmitting over ("SINR-6"). SINR-6 (as computed by the node-0 606) may be $$\frac{\frac{s5}{g56(0)}}{\frac{s0}{g05}}.$$

In some implementations, the node-0 606 enables parallel use of the channel A in response to detecting that both SINR-1 and SINR-6 exceed the MCS threshold.

Thus, the IBI matrix generated according to FIG. 7 may be used to determine whether to enable parallel use of a channel by multiple wireless devices. In some implementations, a system may toggle between a CSMA mode and a mode that supports parallel use of a channel. In some examples, the system may toggle between the CSMA mode and the mode that supports parallel use of the channel in response to input received from a network administrator or in response to a determination about channel availability. For example, a system may switch from a CSMA mode to a parallel use mode in response to determining that all data channels are in use. Further, the system may switch to the CSMA mode from the parallel use mode in response to detecting that unused data channels are available.

Figure 8:
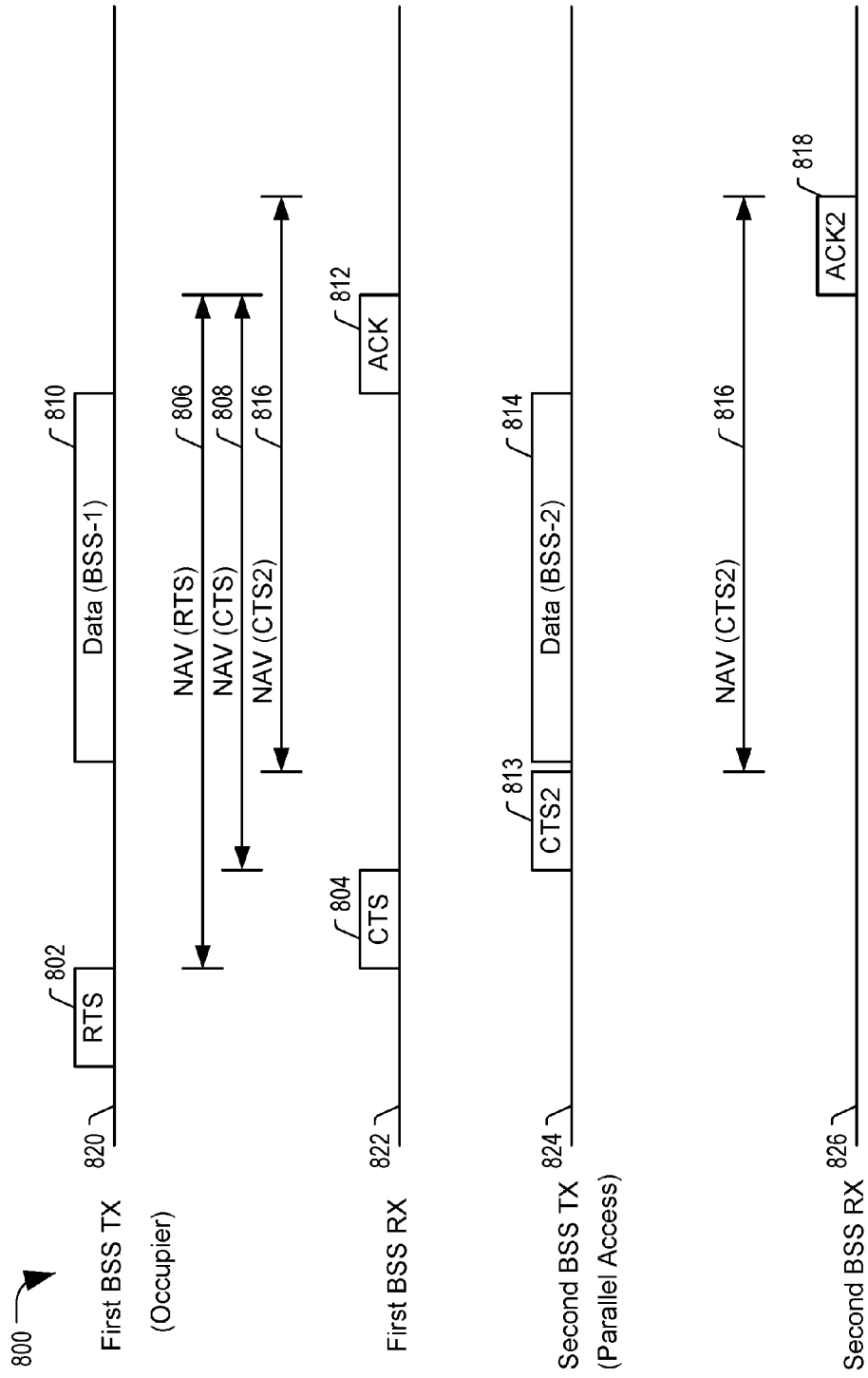
FIG. 8 is a diagram illustrating an example of parallel use of a channel by overlapping basic service sets.

Referring to FIG. 8, a diagram 800 illustrating parallel use of a channel is shown. A first timeline 820 illustrates signals transmitted by a transmitter (e.g., a first wireless device) of a first BSS to a receiver (e.g., a second wireless device) of the first BSS. A second timeline 822 illustrates signals transmitted by the receiver of the first BSS to the transmitter of the first BSS. A third timeline 824 illustrates signals transmitted by a transmitter (e.g., a third wireless device) of a second BSS. A fourth timeline 826 illustrates signals transmitted by a receiver (e.g., a fourth wireless device) of the second BSS.

The transmitter of the first BSS may transmit a request to send (RTS) message 802 to the receiver of the first BSS. Responsive to the RTS message 802, the receiver of the first BSS may transmit a clear to send (CTS) message 804. The RTS message 802 may define a network allocation vector (RTS) window 806. The CTS message 804 may define a NAV (CTS) window 808. During the NAV (CTS) window 808, the transmitter of the first BSS may transmit data 810 to the receiver of the first BSS. The receiver of the first BSS may send an acknowledgement (ACK) 812 to the transmitter of the first BSS in response to receipt of the data 810. The ACK 812 may be sent at the end of the NAV windows 806, 808.

As shown in FIG. 8, the transmitter of the second BSS may transmit a modified CTS2 message 813 during the NAV windows 806, 808 reserved by a device of the first BSS. The modified CTS2 message 813 may notify the receiver of the second BSS that the transmitter of the second BSS is about to transmit data 814. Thus, the modified CTS2 message 813 may define a NAV (CTS2) window 816 that overlaps the NAV windows 806, 808 of the first BSS. Accordingly, the transmitter of the second BSS may transmit the data 814 over the channel at the same time the transmitter of the first BSS is transmitting the data 810 over the channel. In response to receipt of the data 814, the receiver of the second BSS may transmit a second ACK (ACK2) 818 to the transmitter of the second BSS. The second ACK 818 may be sent at the end of the NAV (CTS2) window 816.

In some implementations, the signaling of the second BSS and the first BSS may occur differently than is shown. For example, the receivers in each BSS may transmit the ACK 812 and the ACK2 818 simultaneously. In such cases, one or more of the receivers may calculate SINR values using the IBI matrix to determine whether to enable parallel transmission of ACKs. In some implementations, a length of time the transmitter of the second BSS may use the channel may be defined by the BSS that first reserves a channel. That is, a length of the NAV (CTS2) window 816 may be defined by an end of the NAV (RTS) window 806. Thus, FIG. 8 illustrates how wireless devices of two BSSs may share a single channel.

Figure 9:
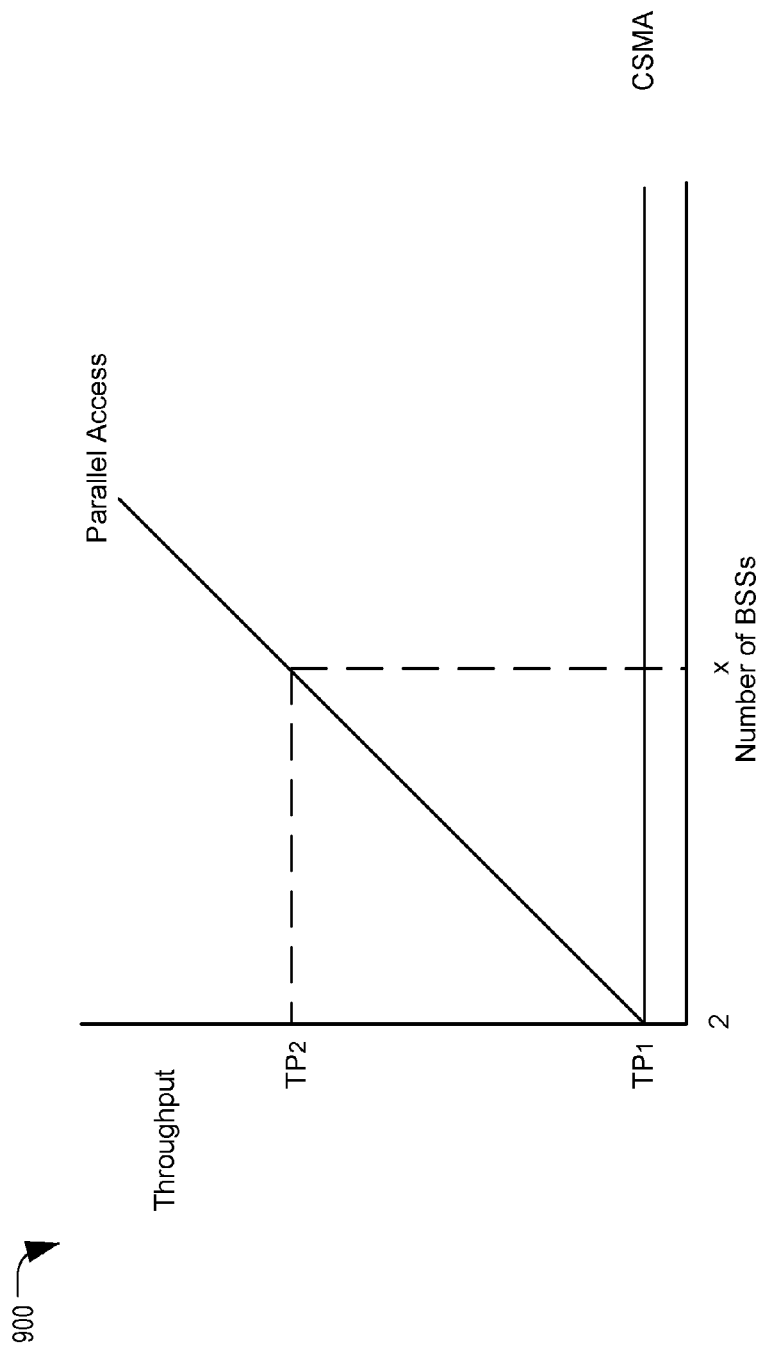
FIG. 9 is a graph illustrating an example of an improvement in throughput efficiency using interference characterization to enable parallel use of a channel.

Referring to FIG. 9, a graph 900 illustrating throughput efficiency gained by using interference characterization to enable parallel use of a channel is shown. As illustrated in FIG. 9, throughput of a channel may remain constant as overlapping BSSs are added to a system using traditional CSMA. For example, throughput may remain at a first throughput (TP1) as additional overlapping BSSs are added to a system. However, using parallel access based on interference characterization may enable throughput of a channel to increase as BSSs are added to the system. To illustrate, at 2 BSSs, a system that enables parallel access may have the first throughput (TP1), but when the system that enables parallel access includes x overlapping BSSs, where x is greater than 2, the system may have a second throughput (TP2) that is greater than TP1. Thus, using interference characterization to enable parallel use of a channel may result in more efficient wireless communications.

Figure 10:
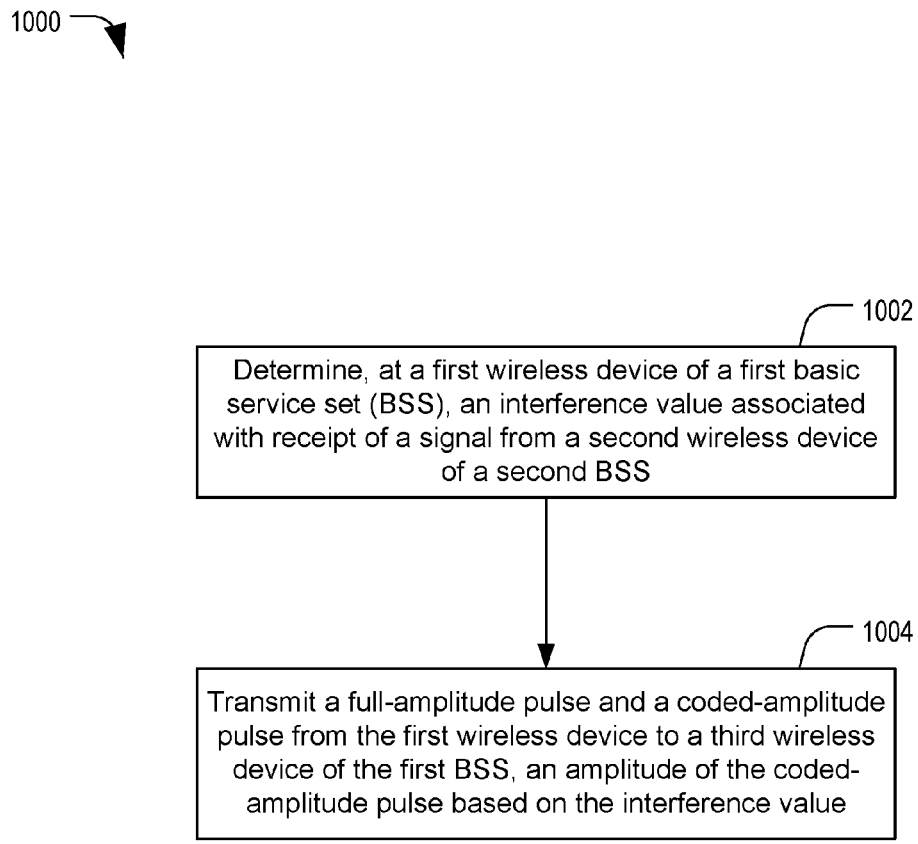
FIG. 10 is a flowchart illustrating an example of a method of inter-basic service set interference characterization.

Referring to FIG. 10, a flowchart illustrating a method 1000 of transmitting an indication of an interference value is shown. The method 1000 may be performed, for example, by the first wireless device 106, the second wireless device 108, the third wireless device 110, the fourth wireless device 202, the node-0 606, the node-1 608, the node-2 610, the node-5 612, the node-6 614, the node-7 616, or another wireless device.

The method 1000 includes determining, at a first wireless device of a first BSS, an interference value associated with receipt of a signal from a second wireless device of a second BSS, at 1002. For example, the first wireless device 106 of the first BSS 102 may determine the interference value g21 associated with receiving the first signal 136 from the second wireless device 108.

The method 1000 further includes transmitting a full-amplitude pulse and a coded-amplitude pulse from the first wireless device to a third wireless device of the first BSS, at 1004. An amplitude of the coded-amplitude pulse is based on the interference value. For example, the first wireless device 106 may transmit the second full-amplitude pulse 144 and the coded-amplitude pulse 146 via the transceiver 118 to the third wireless device 110 as part of the second signal 142. The amplitude of the coded-amplitude pulse 146 may be based on the interference value g21.

Thus, the method 1000 may be used to characterize interference between inter-BSSs. The interference values may be used by a device of a BSS to determine whether to enable parallel access to a channel occupied by a device of another BSS.

In a particular implementation, the method 1000 further includes receiving a trigger signal from a fourth device, where the full-amplitude pulse and the coded-amplitude pulse are transmitted in response to the trigger signal. For example, the first wireless device 106 may transmit the second full-amplitude pulse 144 and the coded-amplitude pulse 146 in response to receiving the first trigger signal 302.

In a particular implementation, the method 1000 further includes transmitting the full-amplitude pulse and the coded-amplitude pulse to a fourth device. For example, the first wireless device 106 may transmit the sixth full-amplitude pulse 310 and the second coded-amplitude pulse 312 to the fourth wireless device 202. The coded-amplitude pulse 146 and the second coded-amplitude pulse 312 may both indicate the interference value g21 (e.g., the coded-amplitude pulse 146 may be equal to or may be the same pulse as the second coded-amplitude pulse 312), as described above. Further, the second full-amplitude pulse 144 may be equal to the sixth full-amplitude pulse 310 or may be the same pulse.

In a particular implementation, the method 1000 further includes determining a second interference value associated with a fourth device and transmitting a second coded-amplitude pulse to the second wireless device. An amplitude of the second coded-amplitude pulse is based on the second interference value. For example, the method 1000 may be executed by the fourth wireless device 202. The fourth wireless device 202 may determine an interference value (e.g., g14) associated with receiving a signal (e.g., the sixth signal 308) from a second wireless device (e.g., the first wireless device 106). The fourth wireless device 202 may transmit a full-amplitude pulse (e.g., the tenth full-amplitude pulse 506) and a coded-amplitude pulse (e.g., the seventh coded-amplitude pulse 508) to a third wireless device (e.g., the second wireless device 108). The fourth wireless device 202 may further determine a second interference value (e.g., g34) associated with a fourth device (e.g., the third wireless device 110). The fourth wireless device 202 may transmit a second coded-amplitude pulse (e.g., the tenth coded-amplitude pulse 518) to the second wireless device (e.g., the first wireless device 106).

In a particular implementation, the method 1000 further includes receiving a second coded-amplitude pulse and, based on an amplitude of the second coded-amplitude pulse, determining a second interference value associated with communication between the second wireless device and the third wireless device. For example, the first wireless device 106 may receive the third coded-amplitude pulse 414 indicating the interference value g23 between the second wireless device 108 and the third wireless device 110.

In a particular implementation, the method 1000 further includes determining a signal-to-interference-plus-noise ratio (SINR) using the interference value. The method may further include, in response to the SINR satisfying a threshold, transmitting data over the channel while the second device transmits second data over the channel. The threshold corresponds to a modulation and coding scheme threshold.

The method 1000 of FIG. 10, the interactions shown in FIGS. 2-5 and FIG. 7, or a combination thereof may be controlled by one or more a processing unit such as a central processing units (CPUs), controllers, field-programmable gate array (FPGA) devices, application-specific integrated circuits (ASICs), other hardware devices, firmware devices, or any combination thereof. As an example, the interactions shown in FIGS. 2-5 and FIG. 7, one or more operations described with reference to FIG. 7, the method 1000 of FIG. 10, or a combination thereof can be performed by one or more processors that execute instructions to perform characterization of interference between inter-basic service sets.

Figure 11:
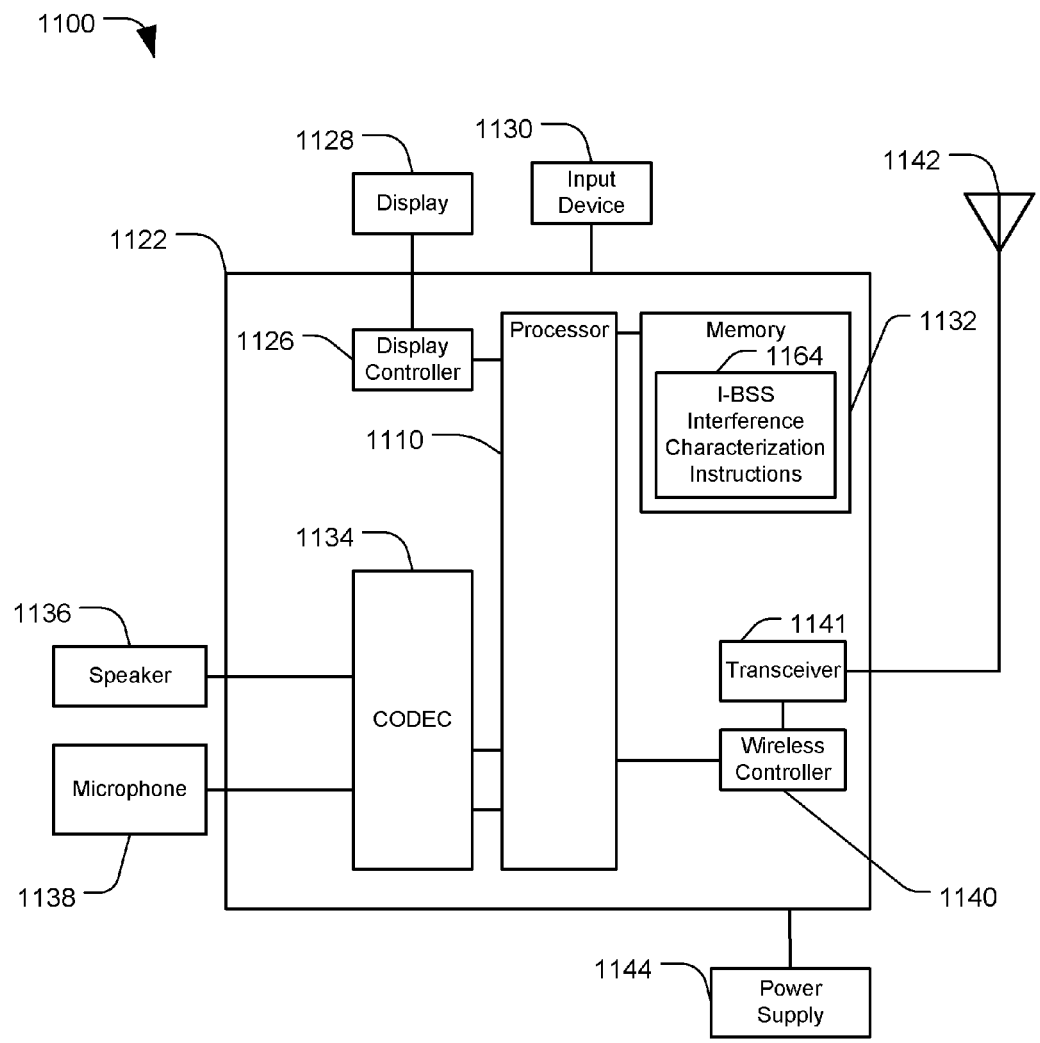
FIG. 11 is a block diagram of an apparatus that supports inter-basic service set interference characterization.

Referring to FIG. 11, a particular illustrative aspect of an electronic device, such as a wireless communication device, is depicted and generally designated 1100. The electronic device 1100 includes a processor 1110, such as a digital signal processor, coupled to a memory 1132. The electronic device 1100, or components thereof, may correspond to an AP or to a STA. For example, the electronic device 1100 may correspond to or be integrated into a mobile device (e.g., one or more of the wireless devices 110, 202 or one and/or more of the nodes 608, 610, 614, 616), an access point (e.g., one or more of the wireless devices 106, 108 and/or one or more of the nodes 606, 612), a combination thereof, or components thereof.

The memory 1132 may store inter-BSS interference characterization instructions 1164. The memory 1132 may correspond to a computer readable storage device storing instructions (e.g., a non-transitory computer readable medium storing instructions). The inter-BSS interference characterization instructions 1164 may be executable by the processor 1110.

The processor 1110 may be configured to execute one or more instructions stored in the memory 1132. The one or more instructions may include the inter-BSS interference characterization instructions 1164. For example, the processor 1110 may be configured to operate in accordance with the interactions described with reference to FIGS. 2-5, in accordance with one or more operations described with reference to FIG. 7, in accordance with the method 1000 of FIG. 10, or a combination thereof. To illustrate, the processor 1110 may be configured to execute the inter-BSS interference characterization instructions 1164 to cause the processor 1110 to interpret received signals and to initiate transmission of signals to perform inter-BSS interference characterization. The inter-BSS interference characterization instructions 1164 may include one or more rules that identify a master AP, an order in which STAs are to respond to trigger tones from the master AP, one or more subcarrier assignments, a largest available amplitude, one or more lookup tables that associates indices with carrier path loss values, such as the lookup table 117, or a combination thereof.

FIG. 11 also shows a display controller 1126 that is coupled to the processor 1110 and to a display 1128. A coder/decoder (CODEC) 1134 can also be coupled to the processor 1110. A speaker 1136 and a microphone 1138 can be coupled to the CODEC 1134.

FIG. 11 also indicates that a wireless controller 1140 can be coupled to the processor 1110 and to an antenna 1142. For example, the wireless controller 1140 may be coupled to the antenna 1142 via a transceiver 1141. The transceiver 1141 may include a transmitter, a receiver, or both. The transceiver 1141 may be configured to transmit one or more signals generated by the electronic device 1100 and to receive one or more signals transmitted to the electronic device 1100 by other devices, such as other stations or other access points. The transmitted and received signals may include CATs, FPTs, or a combination thereof. The wireless controller 1140, the processor 1110, or a combination thereof may be configured to generate CATs, FPTs, or a combination thereof, to be transmitted via the transceiver 1141.

In some implementations, the processor 1110, the display controller 1126, the memory 1132, the CODEC 1134, the wireless controller 1140, and the transceiver 1141 are included in a system-in-package or system-on-chip device 1122. In a particular implementation, an input device 1130 and a power supply 1144 are coupled to the system-on-chip device 1122. Moreover, in another particular implementation, as illustrated in FIG. 11, the display 1128, the input device 1130, the speaker 1136, the microphone 1138, the antenna 1142, and the power supply 1144 are external to the system-on-chip device 1122. However, each of the display 1128, the input device 1130, the speaker 1136, the microphone 1138, the antenna 1142, and the power supply 1144 can be coupled to a component of the system-on-chip device 1122, such as to an interface or to a controller.

In conjunction with one or more of the described aspects of FIGS. 1-11, an apparatus includes means for determining, at a first wireless device of a first BSS, an interference value associated with receipt of a signal from a second wireless device of a second BSS. For example, the means for determining may include the processor 112, the processor 120, the processor 128, or the processor 1110 programmed to execute instructions to operate as described above, one or more other structures, devices, circuits, modules, or instructions to determine an interference value, or any combination thereof.

The apparatus further includes means for transmitting a full-amplitude pulse and a coded-amplitude pulse from the first wireless device to a third wireless device of the first BSS. An amplitude of the coded-amplitude pulse is based on the interference value. For example, the means for transmitting may include the transceiver 118, the transceiver 126, the transceiver 134, the wireless controller 1140, the transceiver 1141, the antenna 1142, one or more other structures, devices, circuits, modules or instructions to transmit the full-amplitude pulse and the coded amplitude pulse, or a combination thereof.

The apparatus may further include means for receiving a second pulse from the second wireless device. For example, the means for receiving may include the transceiver 118, the transceiver 126, the transceiver 134, the wireless controller 1140, the transceiver 1141, the antenna 1142, one or more other structures, devices, circuits, modules or instructions to receive the second pulse, or a combination thereof. The means for determining may be configured to determine the interference value based on a received amplitude of the second pulse. The second pulse is transmitted by the second wireless device with a full-amplitude.

The apparatus may further include means for storing a table. For example, the means for storing may correspond to one of the memory devices 116, 124, the memory 1132, one or more other structures, devices, circuits, modules or instructions to store the table, or a combination thereof. In particular examples, a ratio of an amplitude of the full-amplitude pulse to the amplitude of the coded-amplitude pulse corresponds to an entry of the table identifying the interference value.

One or more of the disclosed aspects may be implemented in a system or an apparatus, such as the electronic device 1100, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the electronic device 1100 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-11 may illustrate systems, apparatuses, methods, or a combination thereof according to the teachings of the disclosure, the disclosure is not limited to these illustrated systems, apparatuses, or methods. One or more functions or components of any of FIGS. 1-11 as illustrated or described herein may be combined with one or more other portions of another function or component of FIGS. 1-11. Accordingly, no single example described herein should be construed as limiting and examples of the disclosure may be suitably combined without departing from the teachings of the disclosure.

Those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the examples disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus comprising:
   a processor of a first wireless device of a first basic service set (BSS), the processor configured to determine an interference value associated with receipt of a signal from a second wireless device of a second BSS; and
   a transmitter configured to transmit a full-amplitude pulse and a coded-amplitude pulse from the first wireless device to a third wireless device of the first BSS, an amplitude of the coded-amplitude pulse based on the interference value.

2. The apparatus of claim 1, wherein the processor is configured to determine the amplitude of the coded-amplitude pulse based on an entry of a lookup table, the entry corresponding to the interference value.

3. The apparatus of claim 1, wherein the processor is configured to determine the interference value based on a received amplitude of a second pulse received from the second wireless device, the second pulse transmitted by the second wireless device with a full-amplitude.

4. The apparatus of claim 3, wherein the processor is configured to determine the interference value based on a comparison of the received amplitude of the second pulse to an amplitude of the full-amplitude pulse.

5. The apparatus of claim 1, wherein the interference value corresponds to a carrier path loss associated with communication of the signal from the second wireless device to the first wireless device.

6. The apparatus of claim 1, wherein the first wireless device comprises a mobile station and the third wireless device comprises an access point.

7. The apparatus of claim 1, wherein the first wireless device is configured to determine a signal-to-interference-plus-noise ratio (SINR) using the interference value.

8. The apparatus of claim 7, wherein the first wireless device is configured to, in response to the SINR satisfying a threshold, transmit data over a channel while the second wireless device transmits second data over the channel.

9. The apparatus of claim 1, wherein the processor and the transmitter are integrated into a mobile device.

10. A method of transmitting an indication of an interference value, the method comprising:
    determining, at a first wireless device of a first basic service set (BBS), the interference value associated with receipt of a signal from a second wireless device of a second BSS; and
    transmitting a full-amplitude pulse and a coded-amplitude pulse from the first wireless device to a third wireless device of the first BSS, an amplitude of the coded-amplitude pulse indicating the interference value.

11. The method of claim 10, further comprising receiving a trigger signal from a fourth device, wherein the full-amplitude pulse and the coded-amplitude pulse are transmitted in response to the trigger signal.

12. The method of claim 10, further comprising transmitting the full-amplitude pulse and the coded-amplitude pulse to a fourth device.

13. The method of claim 10, further comprising:
    determining a second interference value associated with a fourth device; and
    transmitting a second coded-amplitude pulse to the second wireless device, an amplitude of the second coded-amplitude pulse based on the second interference value.

14. The method of claim 10, further comprising:
    receiving a second coded-amplitude pulse; and
    based on an amplitude of the second coded-amplitude pulse, determining a second interference value associated with communication between the second wireless device and the third wireless device.

15. The method of claim 10, further comprising determining a signal-to-interference-plus-noise ratio (SINR) using the interference value.

16. The method of claim 15, further comprising, in response to the SINR satisfying a threshold, transmitting data over a channel while the second wireless device transmits second data over the channel.

17. The method of claim 16, wherein the threshold corresponds to a modulation and coding scheme threshold.

18. A non-transitory computer readable medium storing instructions that, when executed by a processor, cause the processor to perform operations including:
    determining, at a first wireless device of a first basic service set (BSS), an interference value associated with receipt of a signal from a second wireless device of a second BSS; and
    initiating transmission of a full-amplitude pulse and a coded-amplitude pulse from the first wireless device to a third wireless device of the first BSS, an amplitude of the coded-amplitude pulse based on the interference value.

19. The non-transitory computer readable medium of claim 18, wherein the operations further include receiving a trigger signal from a fourth device, and wherein the full-amplitude pulse and the coded-amplitude pulse are transmitted in response to the trigger signal.

20. The non-transitory computer readable medium of claim 18, wherein the operations further include initiating transmission of the full-amplitude pulse and the coded-amplitude pulse to a fourth device.

21. The non-transitory computer readable medium of claim 18, wherein the operations further include:
    receiving a second pulse from a fourth wireless device;
    determining based, on a received amplitude of the second pulse, a carrier path loss associated with communication of signals from the fourth wireless device, the second pulse transmitted by the fourth wireless device with a full-amplitude; and
    initiating transmission of a second coded-amplitude pulse to the second wireless device, an amplitude of the second coded-amplitude pulse based on the carrier path loss.

22. The non-transitory computer readable medium of claim 18, wherein the operations further include:
    receiving, from the second wireless device, a second coded-amplitude pulse and a third pulse; and
    based on a difference or a ratio between a received amplitude of the third pulse and a received amplitude of the second coded-amplitude pulse, determining an interference value associated with communication between the third wireless device and the second wireless device.

23. An apparatus comprising:
    means for determining, at a first wireless device of a first basic service set (BSS), an interference value associated with receipt of a signal from a second wireless device of a second BSS; and
    means for transmitting a full-amplitude pulse and a coded-amplitude pulse from the first wireless device to a third wireless device of the first BSS, an amplitude of the coded-amplitude pulse based on the interference value.

24. The apparatus of claim 23, further comprising means for receiving a second pulse from the second wireless device, wherein the means for determining is configured to determine the interference value based on a received amplitude of the second pulse, the second pulse transmitted with a full-amplitude by the second wireless device.

25. The apparatus of claim 24, wherein the means for determining is configured to determine the interference value based on a comparison of the received amplitude of the second pulse to an amplitude of the full-amplitude pulse.

26. The apparatus of claim 23, further comprising a means for storing a table, wherein a ratio of an amplitude of the full-amplitude pulse to the amplitude of the coded-amplitude pulse corresponds to an entry of the table identifying the interference value.

27. The apparatus of claim 23, wherein the means for determining is configured to initiate transmission of the full-amplitude pulse and the coded-amplitude pulse in response to a trigger signal.

28. The apparatus of claim 23, wherein the first wireless device is configured to determine a signal-to-interference-plus-noise ratio (SINR) using on the interference value.

29. The apparatus of claim 28, wherein the first wireless device is configured to transmit data over a channel while the second wireless device transmits data over the channel in response to the SINR satisfying a threshold.

30. The apparatus of claim 29, wherein the threshold corresponds to a modulation and coding scheme threshold.

* * * * *